(12) United States Patent
Laor

(10) Patent No.: US 10,468,958 B2
(45) Date of Patent: Nov. 5, 2019

(54) SKIPPING AND ROLO-SKIP ELECTRICAL MOTORS

(71) Applicant: Herzel Laor, Boulder, CO (US)

(72) Inventor: Herzel Laor, Boulder, CO (US)

(73) Assignee: Herzal Laor, Boulder, CO (US)

( * ) Notice: Subject to any disclaimer, the term of this patent is extended or adjusted under 35 U.S.C. 154(b) by 0 days.

(21) Appl. No.: 16/275,372

(22) Filed: Feb. 14, 2019

(65) Prior Publication Data

US 2019/0280581 A1    Sep. 12, 2019

Related U.S. Application Data

(60) Provisional application No. 62/639,509, filed on Mar. 7, 2018.

(51) Int. Cl.
*H02K 37/18* (2006.01)

(52) U.S. Cl.
CPC ................ *H02K 37/18* (2013.01)

(58) Field of Classification Search
CPC ....... H02K 37/18; H02K 41/06; H02K 41/065
USPC ...................................... 310/49.37
See application file for complete search history.

(56) References Cited

U.S. PATENT DOCUMENTS

| | | |
|---|---|---|
| 3,428,839 A | 2/1969 | Singleton et al. |
| 3,452,227 A | 6/1969 | Welch |
| 5,030,866 A | 7/1991 | Kawai |
| 5,606,209 A | 2/1997 | Jacobsen et al. |
| 5,644,177 A * | 7/1997 | Guckel ............... F04B 17/042 310/40 MM |
| 2011/0121669 A1 | 5/2011 | Lacour |
| 2011/0304225 A1 * | 12/2011 | Terashita ............... H02K 5/04 310/49.37 |
| 2014/0184002 A1 * | 7/2014 | Levin ..................... H02K 41/06 310/90 |
| 2014/0319934 A1 * | 10/2014 | Tang ...................... H02K 41/02 310/12.14 |

FOREIGN PATENT DOCUMENTS

JP          60121177    *  6/1985  ............ H02K 41/06

OTHER PUBLICATIONS

Ara N. Knaian, Programmable matter, A new kind of electric motor is the cornerstone of a chain that can bend itself into multiple shapes, Physics Today, Jun. 2013, pp. 64-65.
International (PCT) Search Report and Written Opinion dated Jun. 12, 2019 for International (PCT) Application No. PCT/IL2019/050183 filed Feb. 14, 2019.

* cited by examiner

*Primary Examiner* — Terrance L Kenerly
(74) *Attorney, Agent, or Firm* — A.C. Entis-IP Ltd.; Allan C. Entis; Kenichi N. Hartman

(57) ABSTRACT

A stepper motor comprising: a stator and a rotor; a plurality of N greater than two electromagnets mounted to the stator or to the rotor, each of the electromagnets comprising a core having at least one contact surface, wherein the at least one contact surface of any of the cores is rotatable about a same first axis of rotation with a same first radius of rotation into substantial congruence with at least a portion of the at least one contact surface of any other of the electromagnet cores; and a coupling of the rotor to the stator configured to enable rotation of the rotor and contact of the stator and rotor along at least one contact surface during operation of the motor.

20 Claims, 14 Drawing Sheets

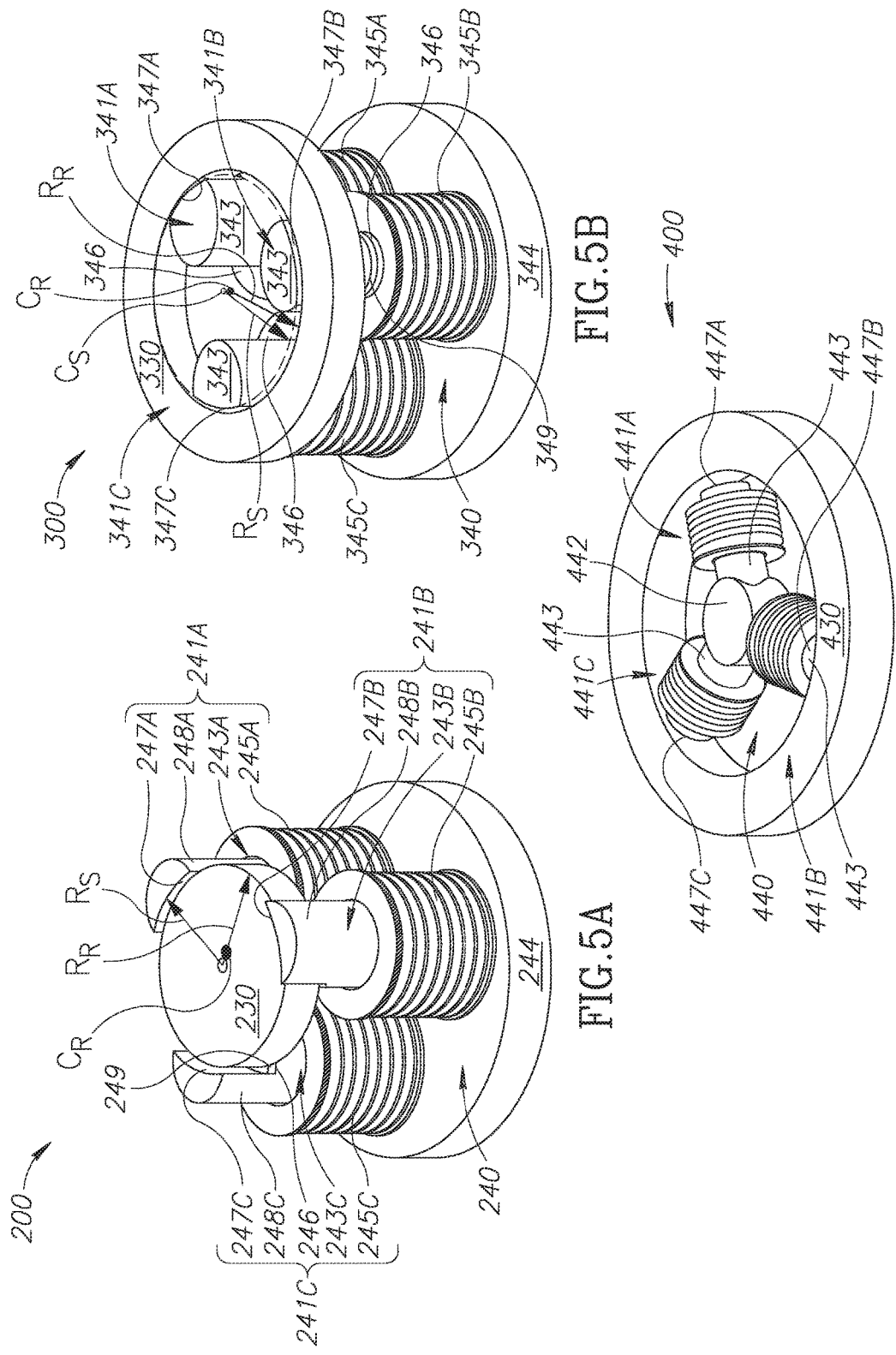

SKIPPING AND ROLO-SKIP ELECTRICAL MOTORS

RELATED APPLICATIONS

The present application claims benefit under 35 U.S.C. 119(e) of U.S. Provisional Application 62/639,509 filed Mar. 7, 2018, the disclosure of which is incorporated herein by reference.

FIELD

Embodiments of the specification relate to electric motors.

BACKGROUND

Electric motors are ubiquitous and come in a plethora of various forms adapted to perform an ever-increasing gamut of applications. From the humble beginnings of Faraday's 1821 demonstration of a current carrying wire rotating around a permanent magnet, electric motors have developed in performance, configuration, and range of power and complexity. Today they may be found by way of limited examples in such disparate applications and environments as children's toys, perambulating, swimming, and flying robots and micro-robots, flying drones, submarines, ground vehicles, and spaceships.

SUMMARY

An aspect of an embodiment of the disclosure relates to providing a versatile electric stepper motor, also referred to as a "skipping motor", in which a rotor of the motor nutates as it rotates clockwise or counterclockwise to execute a skipping-like motion between steps, also referred to as "skips", of the motor. At the end of each skip a magnitude of the nutation is substantially maximum relative to a center of the stator, and the rotor contacts the stator along a set of at least one contact surface of a plurality of contact surfaces of the stator and at least one corresponding contact surface of the rotor. A configuration of rotor and stator contact surfaces that are in contact at an end of a given skip may be referred to as a motor state. Immediately sequential motor states are different from each other and rotated relative to each other by a skip angle.

In an embodiment, each contact surface of the stator comprises a surface of an electromagnet of a plurality of, "N", three or more electromagnets, which may be configured to exhibit an N-fold rotational symmetry characterized by a symmetry angle of rotation $2\pi/N$ about the center of the stator. Contact surfaces of the rotor are surfaces of magnetizable regions of the rotor. Sequentially magnetizing and de-magnetizing each electromagnet of the N electromagnets in accordance with an ON-OFF activation sequence that is shifted in time with respect to the ON-OFF activation sequences of the other electromagnets causes the rotor to sequentially skip through 2N motor states of the skipping motor if the motor comprises an odd number of electromagnets and rotate clockwise or counterclockwise. If the motor comprises an even number of electromagnets the motor skips through N motor states of the motor in rotating clockwise or counterclockwise. At each motor state the rotor is attracted by magnetic fields of the electromagnets so that at least one contact surface of a magnetized stator electromagnet contacts a corresponding contact surface of the rotor and magnetizes the magnetizable region of the rotor associated with the rotor contact surface.

A given motor state of a skipping motor may be distinguished by a label that designates the particular contact surfaces that are in contact when the skipping motor is in the given state. In addition, a label may designate a direction of a magnetic field that is generated to bring the contact surfaces into contact.

In an embodiment, the ON-OFF activation sequences of the electromagnets are configured so that at each motor state contact between the rotor and stator provides a relatively low reluctance magnetic field path for a magnetic field generated by magnetization of at least two magnetized electromagnets of the N electromagnets.

In an embodiment, a number of skips in one complete rotation of the skipping motor rotor and a corresponding skip angle of the rotor per skip may be a function of a ratio, hereinafter also referred to as a skipping ratio, between a radius of a circularly cylindrical surface on which rotor contact surfaces lie and a radius of a circularly cylindrical surface of the stator on which stator contact surfaces lie. Optionally, the skipping motor is controllable to change a skipping ratio of the skipping motor and operate at each of a plurality of different selectable skipping ratios. Optionally the surfaces on which the stator and/or rotor contact surface are respectively located are circularly cylindrical or spherical surfaces. The spherical surfaces enable the skipping motor to operate with an axis of rotation of the rotor angled at different desired tilt angles with respect to an axis of symmetry of the stator.

In an embodiment each electromagnet of a skipping motor has two contact surfaces and in skipping from a first motor state to a second motor state first one and then the other of the two contact surfaces contact the rotor.

Whereas the electromagnets of a skipping motor are described above as comprised in a stator of a skipping motor, in an embodiment the electromagnets and their associated contact surfaces may be comprised in a rotor of a skipping motor and corresponding contact surfaces associated with magnetizable regions may be comprised in a stator of the motor.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter

BRIEF DESCRIPTION OF FIGURES

Non-limiting examples of embodiments of the invention are described below with reference to figures attached hereto that are listed following this paragraph. Identical features that appear in more than one figure are generally labeled with a same label in all the figures in which they appear. A label labeling an icon representing a given feature of an embodiment of the invention in a figure may be used to reference the given feature. Dimensions of features shown in the figures are chosen for convenience and clarity of presentation and are not necessarily shown to scale.

FIGS. 5A-5C schematically show different configurations of a skipping motor in accordance with an embodiment of the disclosure;

DETAILED DESCRIPTION

Figure 1:
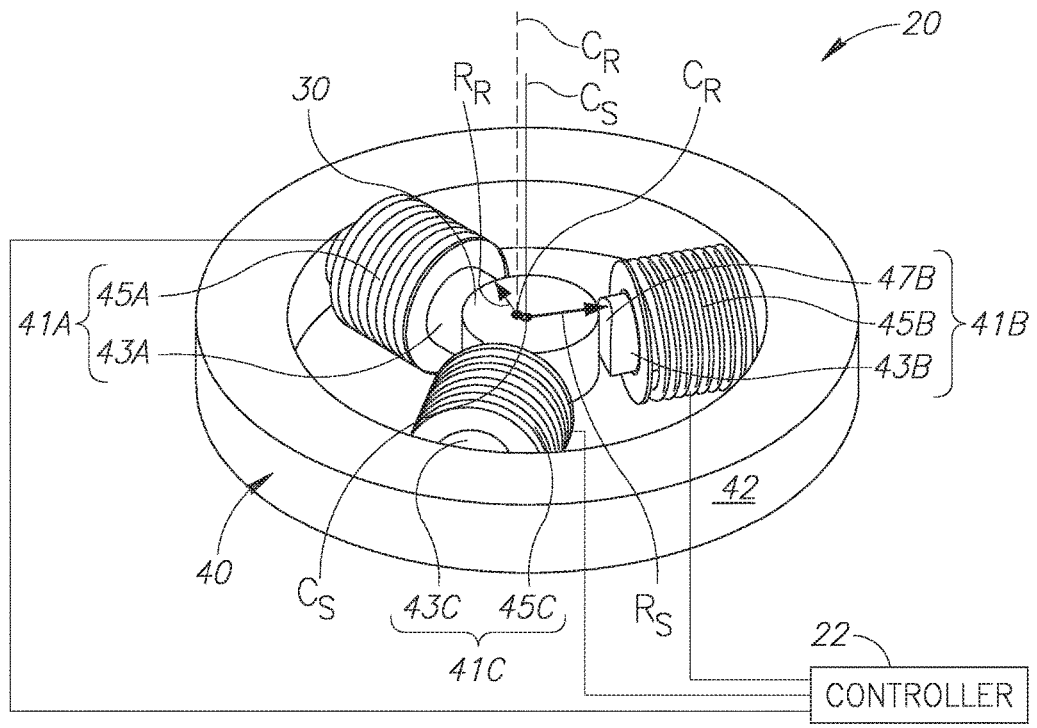
FIG. 1 schematically shows a skipping motor comprising a rotor and a stator having electromagnets, in accordance with an embodiment of the disclosure.
Figure 2A:
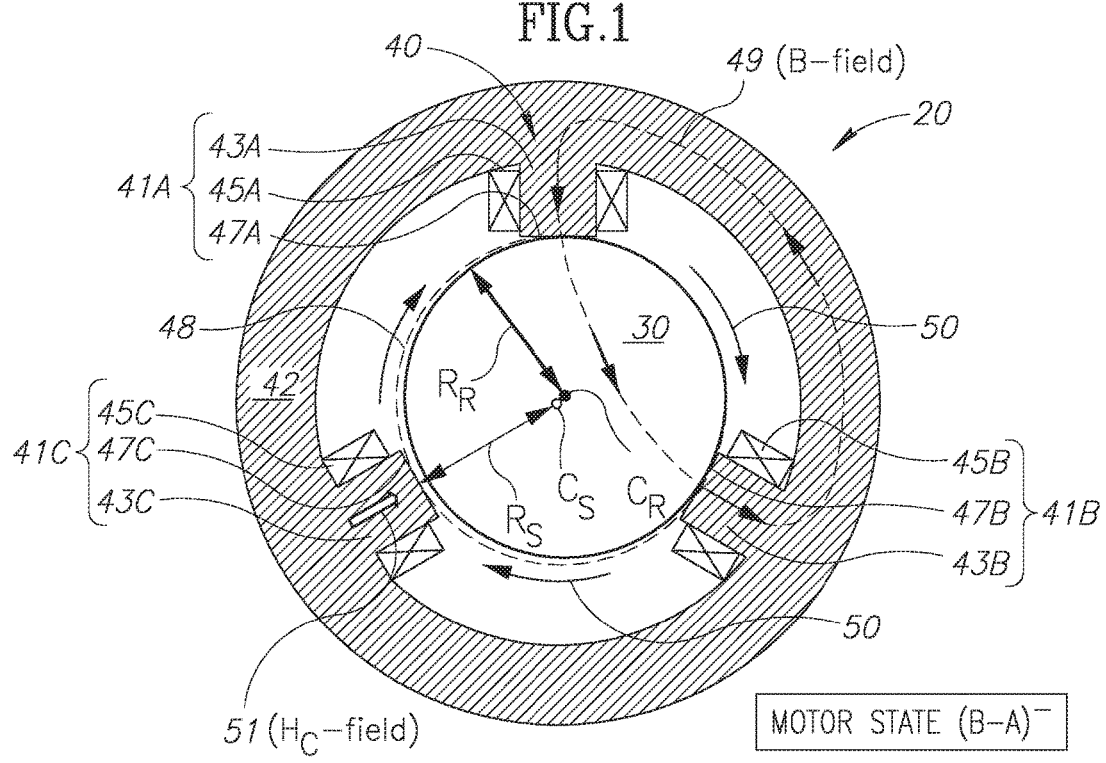
FIGS. 2A-2F schematically show the motor shown in FIG. 1 with the electromagnets being excited to drive the rotor clockwise, in accordance with an embodiment of the disclosure.

FIG. 1 schematically shows a skipping motor 20 comprising a circularly cylindrical ferromagnetic rotor 30 located inside a stator 40 having, optionally three, electromagnets 41A, 41B, and 41C, supported by a cylindrical shell shaped support ring 42, in accordance with an embodiment of the disclosure. Rotor 30 has a radius of rotation $R_R$ about an axis of rotation represented by a dashed line labeled $C_R$ that passes through a central point of the rotor indicated by a solid circle also labeled $C_R$. Central point $C_R$ may be referred to as a center $C_R$ and axis of rotation $C_R$ may be referred to and represented by center $C_R$. Electromagnets 41A, 41B, and 41C comprise ferromagnetic cores 43A, 43B, 43C respectively that extend from ferromagnetic support ring 42. Activation coils 45A, 45B, 45C of electrically conductive wire respectively surround cores 43A, 43B, 43C. Cores 43A, 43B, 43C have respective end surfaces 47A, 47B, 47C, of which only end surface 47B is shown in the perspective of FIG. 1. End surfaces 47A, 47B, 47C are substantially tangent to a same cylindrical surface having radius $R_S$ about axis of rotation represented by a solid line labeled $C_S$ that passes through a central point of stator 40 indicated by a circle also labeled $C_S$. Central point $C_S$ may be referred to as a center $C_S$ and the axis of rotation may be referred to and represented by center $C_S$. FIG. 2A discussed below schematically shows a plan view of skipping motor 20 in which the cylindrical surface having radius $R_S$ and center $C_S$ to which end surfaces 47A, 47B, 47C are tangent is indicated by a dashed circle 48 having radius $R_S$ and center $C_S$. End surfaces 47A, 47B, and 47C are stator contact surfaces which rotor 30 contacts at different motor states during operation of skipping motor 20 as discussed below with reference to FIGS. 2A-2F. In an embodiment support ring 42 and cores 43A, 43B, 43C are integrally formed from a same ferromagnetic material. A controller 22 is configured to drive current through activation coils 45A, 45B, 45C to magnetize and demagnetize electromagnets 41A, 41B, and 41C and generate nutating, skipping, rotary motion of rotor 30, in accordance with an embodiment of the disclosure. Driving a current through an activation coil may be referred to as exciting or energizing the coil or electromagnet.

FIGS. 2A-2F schematically show plan views of skipping motor 20 at sequential motor states during operation of the motor in which controller 22 controls the motor to generate, optionally clockwise, rotary skipping motion of rotor 30, in accordance with an embodiment of the disclosure. Direction of rotation of rotor 30 is indicated by direction arrows 50. At each motor state rotor 30 contacts only two of the three stator contact surfaces 47A, 47B, 47C. A given motor state for skipping motor 20 may be designated by a label that includes reference to the two stator contact surfaces that rotor 30 contacts in the given motor state. Additionally, the label indicates a direction of a magnetic B-field generated by electromagnets that are magnetized during a skip that brought the motor to the given motor state and into contact with the two stator contact surfaces of the given motor state. As discussed below, a superscript $^+$ is used to indicate a clockwise direction of the magnetic B-field and a superscript $^-$ is used to indicate a counter clockwise direction of the magnetic B-field.

For example, FIG. 2A schematically shows skipping motor 20 in a motor state in which rotor 30 contacts stator contact surfaces 47B and 47A of electromagnets 41B and 41A and is distanced from stator contact surface 47C. A magnetic B-field generated by magnetizing electromagnets 41B and 41A to bring rotor 30 into contact with stator contact surfaces 47B and 47A in accordance with an embodiment is indicated by a dashed line 49 and associated arrows indicating direction of the magnetic B-field along the dashed line. Dashed line 49 and its associated direction arrows may be referred to as a field line 49. For the motor state of skipping motor 20 shown in FIG. 2A field line 49 indicates that the magnetic B-field has a counterclockwise direction. A label (B-A)$^-$, in which the minus sign indicates a counterclockwise B-field direction may designate the motor state in FIG. 2A. For a motor state in which rotor 30 contacts stator contact surfaces 47B and 47A but the direction of magnetic B-field is clockwise, as shown for example in FIG. 2D, the motor state is designated (B-A)$^+$, in which the plus sign is used to indicate that the B-field has a clockwise direction.

Figure 2B:
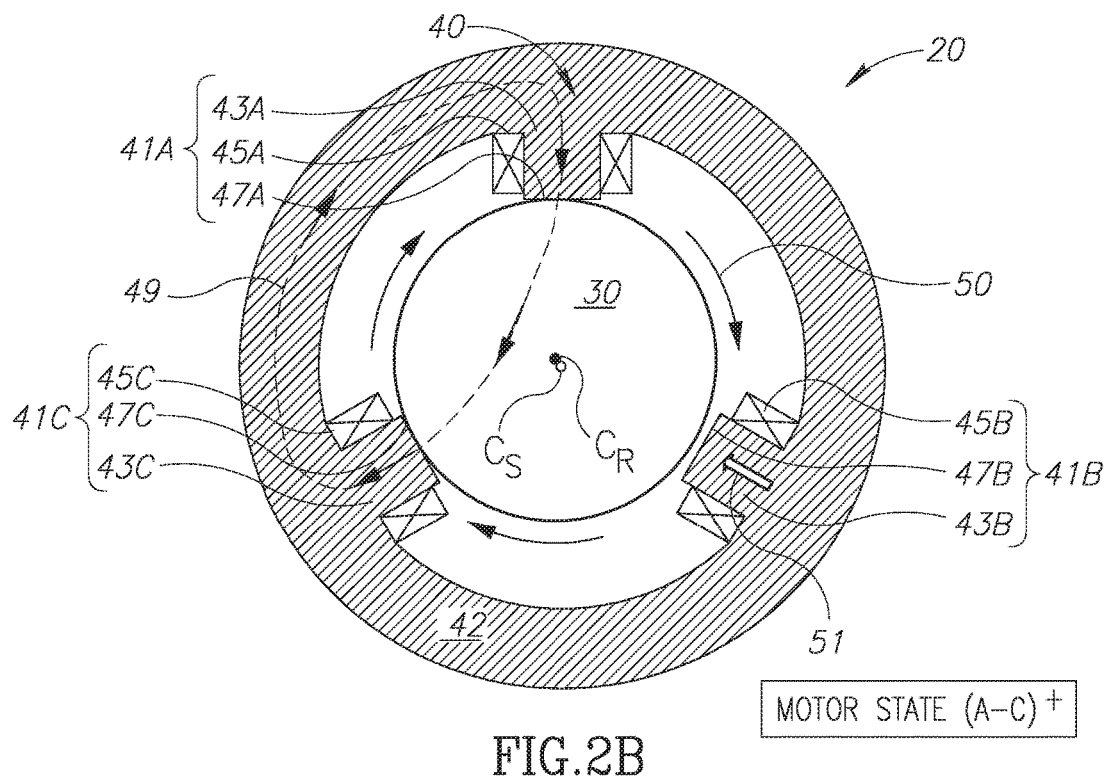
Figure 2C:
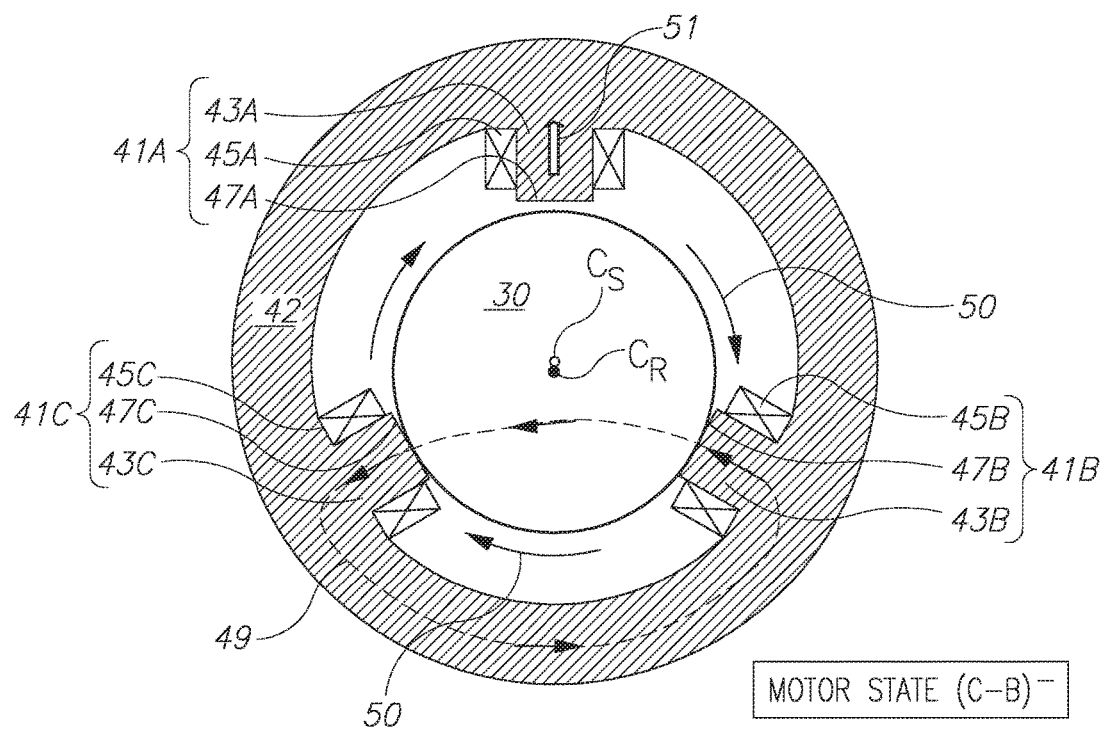
Figure 2D:
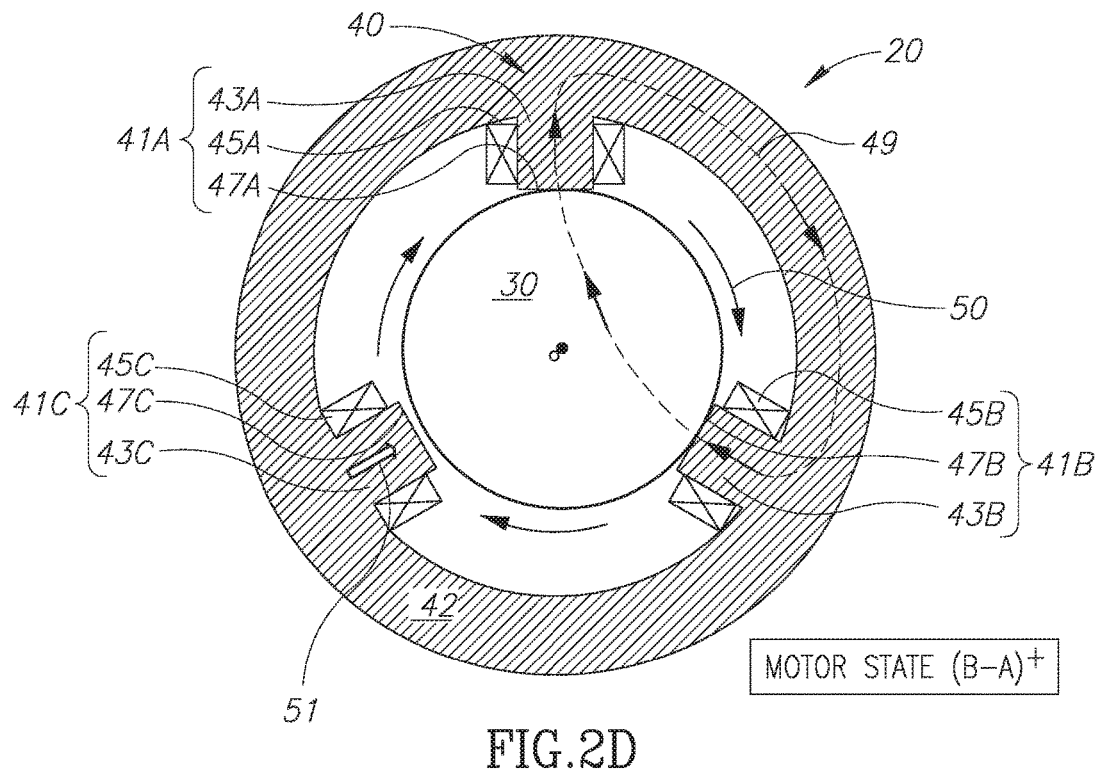

It is noted that whereas the motor state shown in FIG. 2A is labeled (B-A)$^-$, it could just as well have been labeled (A-B)$^-$, and that the motor state shown in FIG. 2D could have been labeled (A-B)$^+$ instead of (B-A)$^+$. However, as illustrated for example in FIGS. 2A-2F, any two first and second sequential motor states of skipping motor 20 share a same stator contact surface, and that in skipping from the first motor state to the second motor state, rotor 30 remains in contact with and pivots about the shared stator contact surface between the motor state before the skip and the motor state after the skip. For clockwise rotation of rotor 30 between a first motor state to a second motor state, for example as shown in the sequence of figures from FIG. 2A to FIG. 2F, the pivot contact surface of stator 40 is the most counterclockwise stator contact surface of the two stator contact surfaces that rotor 30 contacts in the first motor state. For counterclockwise rotation of rotor 30, the pivot surface is the most clockwise pivot surface of the two stator contact surfaces that rotor 30 contacts in the first motor state. For convenience of presentation a label of a given motor state that references the two stator contact surfaces that rotor 30 contacts in the given motor state may recite first the contact surface about which the rotor pivots to reach the given motor state.

For example, for clockwise rotation of rotor 30 illustrated in FIGS. 2A-2F, rotor 30 pivots about contact surface 47A to rotate clockwise from the motor state (B-A)⁻ shown in FIG. 2A to contact stator contact surface 47C to reach the motor state shown in FIG. 2B in which rotor 30 contacts stator contact surfaces 47A and 47C. A label designating the motor state shown in FIG. 2B references the contact surfaces, by reciting first A rather than C, and labels the state (A-C)⁺ rather than (C-A)⁺. Similarly, since the label (B-A)⁻ for the motor state shown in FIG. 2A, recites B before A, the label assumes that the state in FIG. 2A resulted from a clockwise pivot of rotor 30 about stator surface 47B, rather than a counterclockwise pivot about stator surface 47A.

It is noted that in rotating between the motor state (B-A)⁻ to the motor state (A-C)⁺ of skipping motor 20, direction of magnetic B-field reverses from counterclockwise to clockwise. In general, in skipping from a first motor state to a second motor state, in accordance with an embodiment, direction of magnetic B-field in the second motor state is reversed relative to a direction of the magnetic B-field in the first motor state. As a result, for a skipping motor having an odd number of electromagnets in accordance with an embodiment, direction of magnetization of electromagnets effecting contact of the motor's rotor with a given pair of stator contact surfaces reverses every time the rotor rotates in a same clockwise or counterclockwise direction through all the motor states of the motor to return and contact the given pair of stator contact surfaces. For a skipping motor having an even number of electromagnets the direction of magnetic B-field, which may be clockwise or counterclockwise depending upon initial start-up conditions of the motor, remains the same each time the rotor cycles clockwise or counterclockwise through all the motor states to return to the given motor state.

Figure 2E:
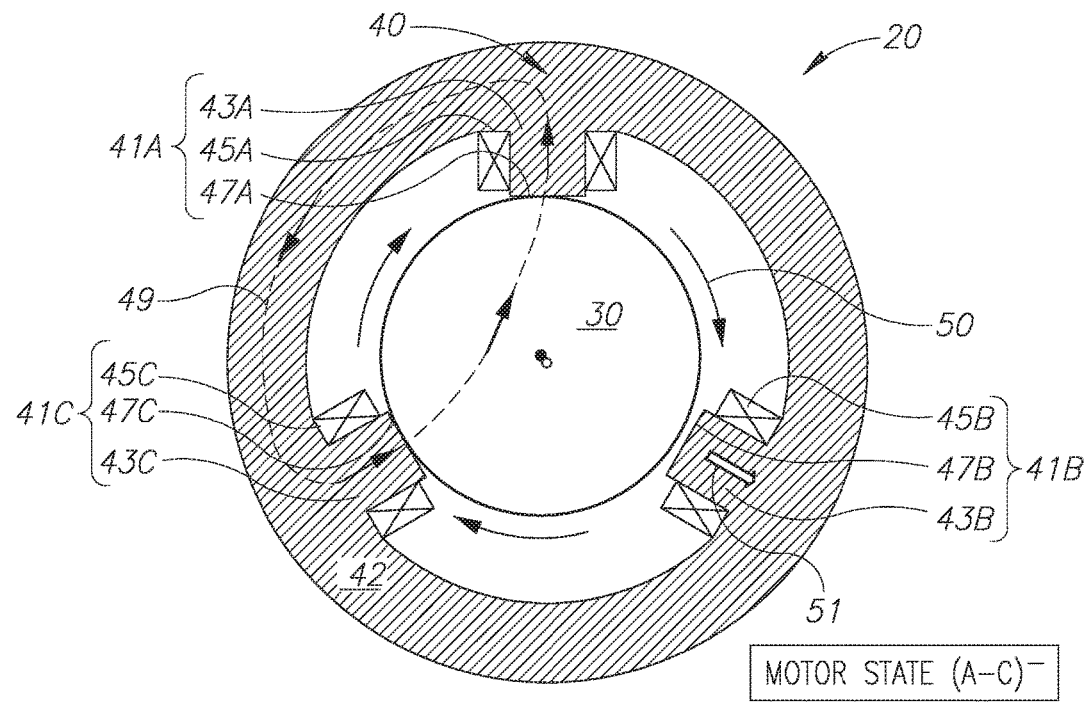
Figure 2F:
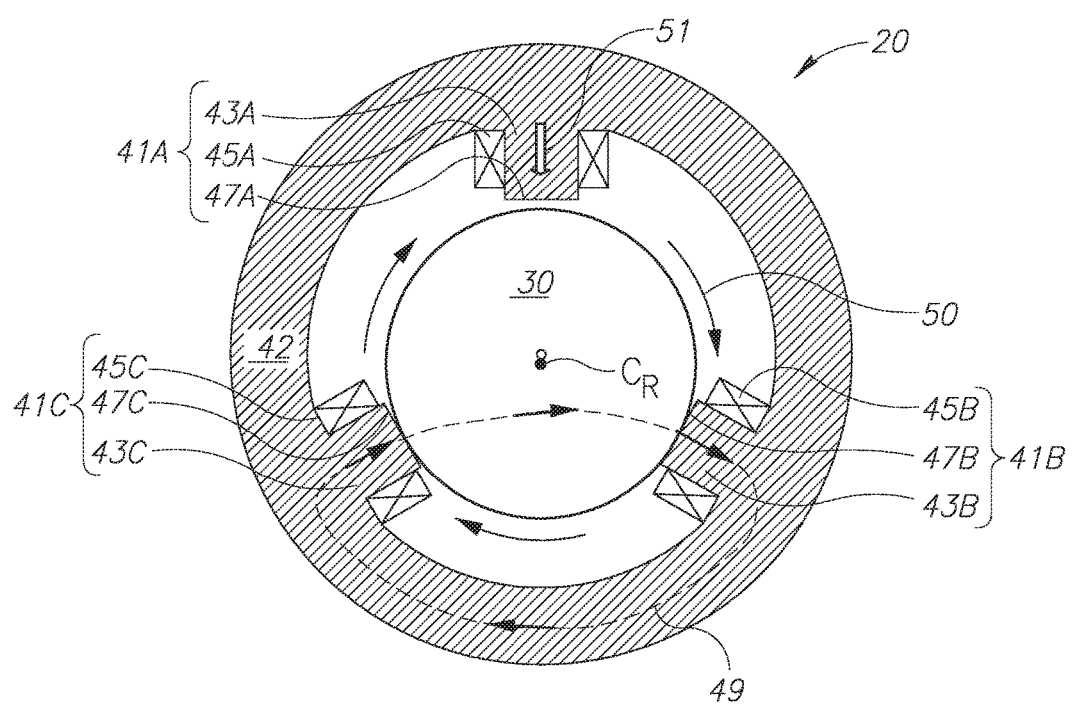
Figure 2G:
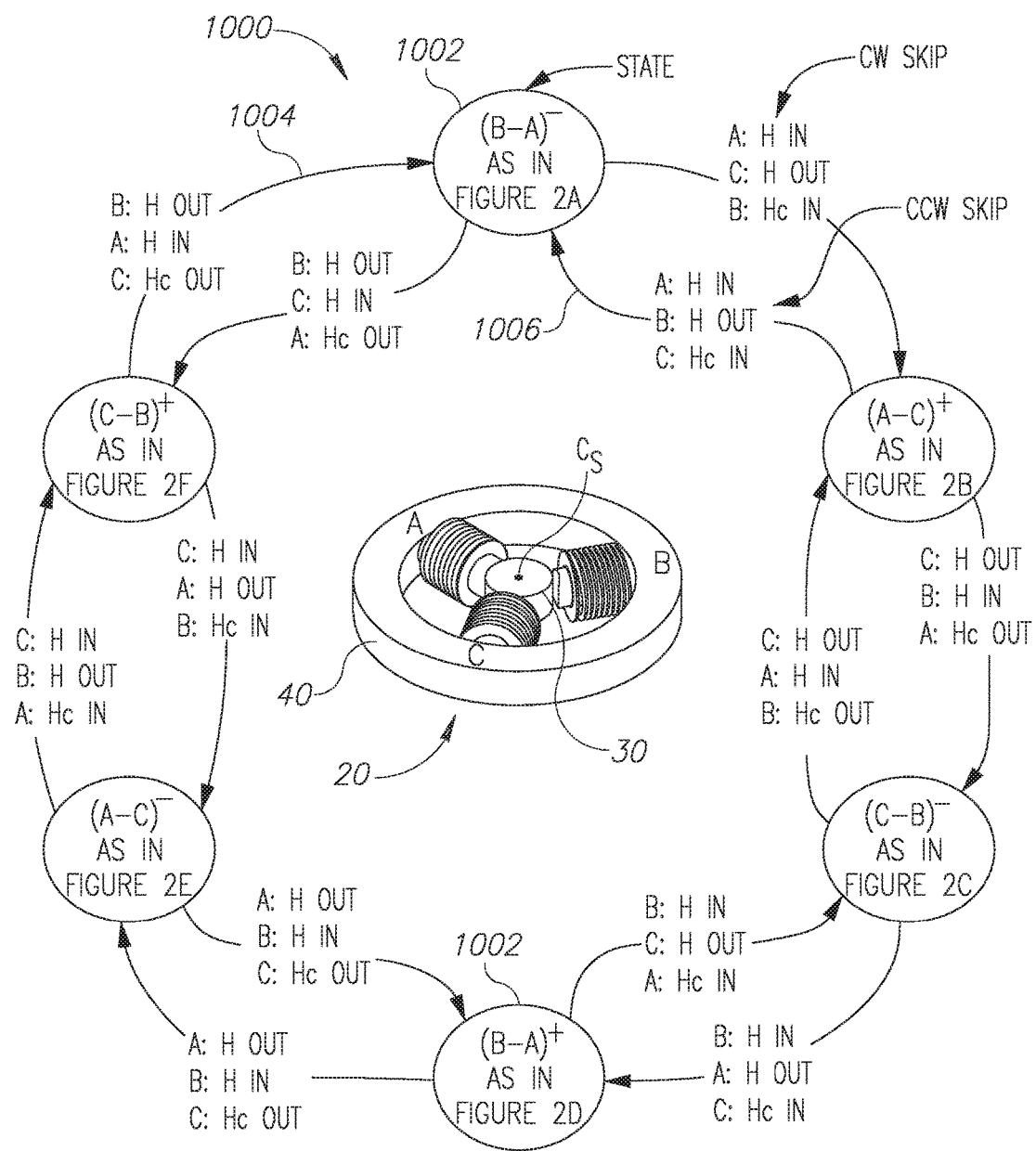
FIG. 2G shows a state diagram that schematically illustrates both clockwise and counterclockwise rotation of the skipping motor shown in FIGS. 1-2F, in accordance with an embodiment of the disclosure.

Details and aspects of the clockwise skipping motion of rotor 30 and magnetization of stator electromagnets 41A, 41B, and 41C that generates the clockwise skipping motion of skipping motion shown in FIGS. 2A-2F are discussed below. It should be noted that whereas FIGS. 2A-2F illustrate clockwise rotation and skipping of skipping motor 20 from any motor state to a next motor state, skipping motor 20 may of course rotate counterclockwise and skip counterclockwise from any motor state to a next motor state, as may be realized when considering FIGS. 2A-2F in reverse order from FIG. 2F to FIG. 2A. FIG. 2G discussed below shows a state diagram that schematically illustrates both clockwise and counterclockwise rotation of skipping motor 20, in accordance with an embodiment of the disclosure.

To bring skipping motor 20 to motor state (B-A)⁻ shown in FIG. 2A controller 22 drives currents in coils 45A and 45B to magnetize electromagnets 41A and 41B and induce magnetization in rotor 30 that attracts the rotor to contact stator contact surfaces 47A and 47B of electromagnets 41A and 41B. The controller drives current in coil 45C to create a coercive "$H_C$-field" force and demagnetize electromagnet 41C and substantially nullify any remanent, "$B_R$-field" magnetic flux in core 43C of the electromagnet so that rotor 30 is released from and not attracted to contact surface 47C of electromagnet 41C. The direction of current in electromagnet 41C that creates the $H_C$-field is reversed to the last direction of H-field and B-field in electromagnet 41C, and depends on which was the previous state of the skipping motor 20 before the state shown in FIG. 2A.

In accordance with an embodiment controller 22 controls direction of current through activation coils of a pair of electromagnets to which rotor 30 is attracted in a given motor state so that if a direction of magnetization in one of the pair of electromagnets points in a direction "inward" toward center $C_S$ (FIGS. 1-2F) of stator 40, direction of the magnetization in the other electromagnet of the pair points "outward" away from the center. Controller 22 controls direction of magnetization of a given electromagnet 41A, 41B, and 41C by controlling clockwise or counterclockwise sense of current that the controller generates in activation coil 45A, 45B, and 45C respectively of the electromagnet, relative to a direction extending through the activation coil and facing center $C_S$ of stator 40. If, facing center $C_S$, current in the activation coil is in the clockwise sense, direction of magnetization and magnetic B-field of the given electromagnet is inward, toward the center $C_S$. If on the other hand sense of the current in the activation coil is counterclockwise, direction of magnetization and magnetic B-field in the given electromagnet is outward from the center.

As a result of magnetizing a pair of electromagnets in opposite directions in accordance with an embodiment, magnetization of electromagnets 41A, 41B, and 41C for a given motor state provides a relatively low reluctance path indicated by the contour of field line 49 through rotor 30 and a portion of support ring 42 of stator 40 for flux of a magnetic B-field that the magnetization generates.

To cause rotor 30 to skip and rotate clockwise from motor state (B-A)⁻ shown in FIG. 2A to a next, clockwise, motor state (A-C)⁺ shown in FIG. 2B, controller 22 substantially simultaneously: 1) drives a current to demagnetize electromagnet 41B to nullify force between the rotor and stator contact surface 47B; 2) drives activation coil 45C with a counterclockwise current to magnetize electromagnet 41C with an H-field in a direction pointing away from center $C_S$ and attract rotor 30 to stator contact surface 47C; and 3) drives activation coil 45A with a clockwise current to magnetize electromagnet 41A with an H-field pointing in a direction towards center $C_S$. As a result, rotor 30 remains in contact with and pivots about stator contact surface 47A, to rotate and contact stator contact surface 47C and rotate skip to motor state (A-C)⁺. Controller 22 operates to demagnetize electromagnet 41B by pulsing activation coil 45B with a clockwise demagnetizing current pulse that generates a magnetic H-field, conventionally often referred to as a coercive magnetic H-field denoted $H_C$, to substantially null remanent magnetization $B_R$ field of core 43B resulting from hysteresis of the material from which the core, rotor and ring are formed. A block arrow 51 in core 43B in FIG. 2B indicates that in skipping clockwise from motor state (B-A)⁻ to motor state (A-C)⁺, the direction of the coercive field $H_C$ that the demagnetization current pulse generates in core 43B needs to be towards center $C_S$ to remove remanent B-field remaining from B-field 49 shown for the previous motor state shown in FIG. 2A. Magnetic B-field flux for motor state (A-C)⁺ represented by field line 49 in FIG. 2B is directed clockwise. It is noted that for a counterclockwise rotation of rotor 30, that is from FIG. 2C to 2B, the demagnetization field $H_C$-field, arrow 51 in FIG. 2B, would be aimed outward, away from center $C_S$, and not inward toward $C_S$ as shown in FIG. 2B for clockwise rotation of rotor 30.

FIG. 2C schematically shows skipping motor 20 in motor state (C-B)⁻ after rotor 30 pivots about stator contact surface 47C from motor state (A-C)⁺ to rotate and contact stator contact surface 47B similarly to the way in which the rotor skipped and rotated from motor state (B-A)⁻ to motor state (A-C)⁺. FIG. 2D schematically shows skipping motor 20 having skipped and rotated from motor state (C-B)⁻ shown in FIG. 2C to a motor state (B-A)⁺, in which rotor 30 contacts the same contact surfaces 47A and 47B that the rotor contacts in motor state (B-A)⁻ schematically shown in FIG. 2A. However, in motor state (B-A)⁺ magnetic B-field flux represented by field line 49 is clockwise, opposite to the counterclockwise direction of B-field flux for motor state (B-A)⁻. FIGS. 2E and 2F schematically show skipping motor 20 after rotor 30 has rotated respectively to motor states (A-C)⁻ and (C-B)⁺.

FIG. 2G shows a directed state graph 1000 that schematically illustrates both clockwise and counterclockwise rotation of skipping motor 20 shown in FIGS. 1-2F, in accordance with an embodiment of the disclosure. Each motor state of skipping motor 20 is indicated by an ellipse 1002 labeled with the motor state and a figure of FIGS. 2A-2F in which the motor state is shown. Edge arrows 1004 directed clockwise indicate clockwise transitions or skips between states for clockwise rotation of rotor 30. Each clockwise edge is labeled with directions of the magnetic H-fields that are generated by currents in the electromagnets 241A, 241B, and 241C to produce the skip. IN and OUT refer to H-fields pointing respectively towards and away from center $C_S$ of stator 40 of skipping motor 20. Similarly edge arrows 1006 directed counterclockwise and labeled with magnetic H-field directions indicate counterclockwise skips between states for counterclockwise rotation of rotor 30.

Figure 3A:
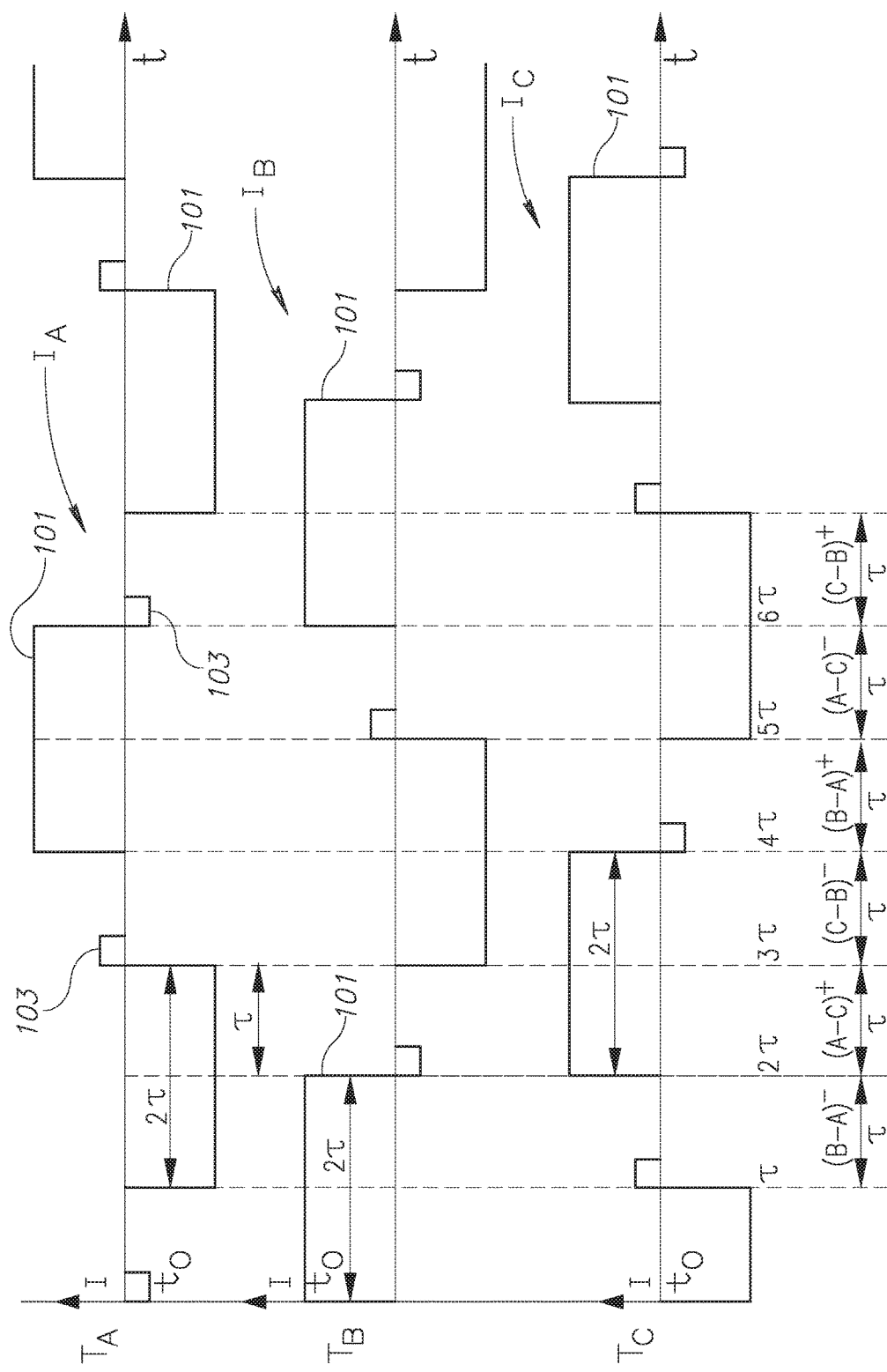
FIGS. 3A and 3B show graphs of activation sequences as a function of time for each of the electromagnets of the skipping motor shown in FIGS. 1-2F that generate clockwise rotation of the skipping motor, in accordance with an embodiment of the disclosure.

FIG. 3A schematically shows ON-OFF activation sequence timelines $T_A$, $T_B$, and $T_C$ in accordance with which controller 22 respectively magnetizes and demagnetizes electromagnets 41A, 41B, and 41C as a function of time to generate the clockwise, skipping rotation of rotor 30 of skipping motor 20 shown in FIGS. 2A-2F, in accordance with an embodiment of the disclosure. Activation sequence timelines $T_A$, $T_B$, and $T_C$ schematically show electric currents $I_A$, $I_B$, and $I_C$ that controller 22 drives through activation coils 45A, 45B, and 45C of electromagnets 41A, 41B, and 41C respectively as a function of time to magnetize and demagnetize the electromagnets assuming continuous clockwise motion of rotor 30. Time along each timeline $T_A$, $T_B$, and $T_C$ is indicated along an abscissa labeled "t". Magnitude of a current driven through a given electromagnet is indicated by displacement from the abscissa along an ordinate labeled "I" of the time line.

In an embodiment, for continuous clockwise rotation of rotor 30 each current $I_A$, $I_B$, and $I_C$ may comprise a train of current pulses 101 of alternating polarity and optionally same duration $2\tau$. A time period t is a time it takes for skipping motor 20 to skip from a first motor state to a next second motor state plus a time, a dwell time, it remains in the second motor state after skipping and until it begins a skip to a next, third motor state. A skipping plus dwell time for a particular motor state may be referred to as a cycle period, or period of the motor state. A positive current pulse 101 lies above its associated time abscissa t and represents a clockwise current pulse driven through a coil 45A, 45B, and 45C of an electromagnet 41A, 41B, and 41C respectively that magnetizes the electromagnet in a direction pointing inwards toward center $C_S$ (FIGS. 1-2F) of stator 40. A negative current pulse 101, lies below its associated time abscissa t, and represents a counterclockwise current pulse that controller 22 drives through a coil 45A, 45B, and 45C of an electromagnet 41A, 41B, and 41C respectively to magnetize the electromagnet in a direction pointing outwards, away from center $C_S$ of stator 40. Each current pulse 101 is followed by a small demagnetizing current pulse 103, that creates an $H_C$-field, schematically represented by block arrows 51 in FIGS. 2A-2F, having direction opposite to that of the H and B-fields created by the given current pulse 101 that the demagnetizing pulse follows. The coercive $H_C$-field substantially nullifies remanent $B_R$-field remaining after the given current pulse 101 has ended in the core of the electromagnet to which the given current pulse 101 was applied and in portions of the rotor and support ring. Demagnetizing current pulse 103 may be lower in magnitude and/or shorter in duration than current pulse 101 that it follows because a remanent magnetic $B_R$-field remaining after cessation of the current pulse is lower than the B-field generated by the current pulse.

Whereas electromagnet currents $I_A$, $I_B$, and $I_C$ in an embodiment have optionally substantially same form, to provide rotation of rotor 30 controller 22 controls their respective time developments as functions of time with different phases, or time displacements relative to a common time origin. For example, in an embodiment of the disclosure to provide clockwise rotation of rotor 30 and the motor states as shown in FIGS. 2A-2F relative to an arbitrary time origin $t_O$ in FIG. 3A, a first positive current pulse in electromagnet current $I_A$ is delayed by a time $4t$, electromagnet current $I_B$ is not delayed, and electromagnet current $I_C$ is delayed by a time $2t$. For the configuration of electromagnet currents shown in FIG. 3A skipping motor 20 cycles continuously through motor states (B-A)⁻, (A-C)⁺, (C-B)⁻, (B-A)⁺, (A-C)⁻, and (C-B)⁺, shown in FIGS. 2A-2F with the skipping motor skipping to and remaining in each motor state for a motor state period equal to about $\tau$, that is, half a pulse width of a current pulse 101. The motor states and their respective cycle periods are shown at the bottom of FIG. 3A below segments of electromagnet currents $I_A$, $I_B$, and $I_C$ along activation sequence timelines $T_A$, $T_B$, and $T_C$ that generate the motor states. The cycle periods of the motor states and their respective corresponding segments of electromagnet currents $I_A$, $I_B$, and $I_C$, are demarked by vertical dashed lines labeled by the onset times of the motor states. It is noted that in FIG. 3A the de-magnetization current pulse 103 is shorter than $\tau$, as in practice, this current pulse may be need only until the remanent magnetic B-field is zeroed out. However, for convenience of control, current pulse 103 may continue for the full time r of a state.

Figure 3B:
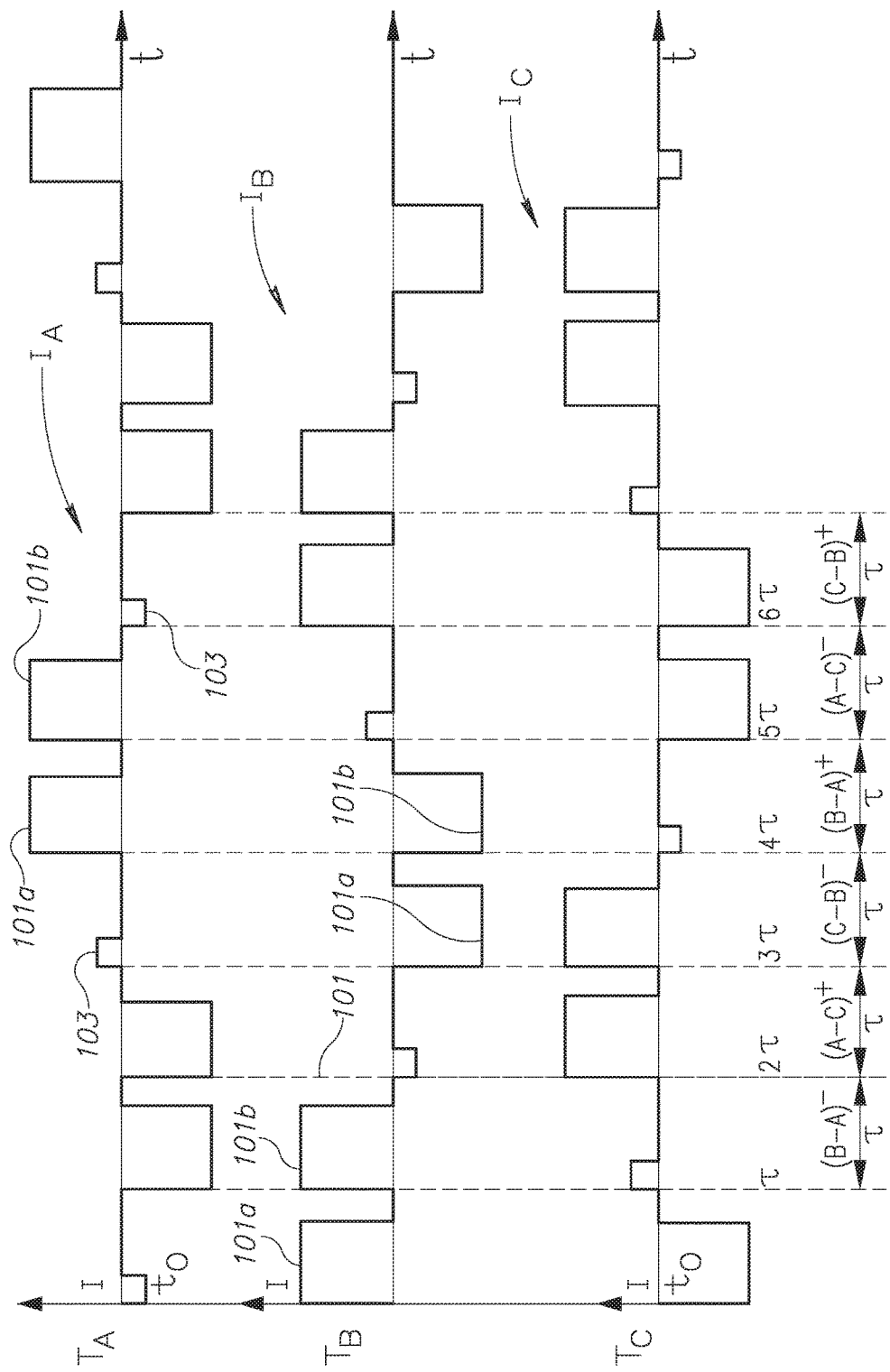

It is noted that for the continuous rotation assumed for ON-OFF activation sequence timelines $T_A$, $T_B$, and $T_C$ shown in FIG. 3A electromagnet currents that attract rotor 30 to stator contact surfaces of stator 40 for a given motor state are continuously on from the beginning of a skip to the given motor state to a time at which skipping motor 20 is controlled to skip to a next state. That is, the "attractive" electromagnet currents are continuously on for the duration of the given motor state cycle period. In an energy saving mode of operation of skipping motor 20, electromagnet currents that attract rotor 30 to stator contact surfaces of stator 40 for a given motor state are stopped before the end of the motor state cycle period. The rotor is held in the given motor state by a remanent magnetic B-field from the time the currents are stopped until the end of the motor state cycle period. FIG. 3B shows a mode of operation of skipping motor 20 for which "attractive" electromagnet current pulses are shorter than motor state cycle periods. Current pulses 101 shown in FIG. 3A are replaced by current pulses 101a and 101b in FIG. 3B.

It is further noted that when motor 20 is stopped it may be held in a last motor state by remanent B-fields or by maintaining the electromagnet currents that attracted rotor 30 to stator contact surfaces of stator 40 for the last motor state. For hardened soft magnetic steel AISI 1020 it was found that remanent flux held the rotor in place for 3 months, with torque similar to a torque with energized activation coils. With hardened hard magnetic steel such as AISI 1090 with 0.9% carbon, the remanent flux and the holding torque is expected to be higher. If it is desired that the motor be free to rotate when stopped, a pulse of current may be used in the last two activation coils to be energized, to cancel remanent flux. Alternatively, clockwise and counterclockwise electromagnet current pulses with diminishing amplitude may be used to demagnetize the electromagnets. Alternatively, cores of the electromagnets, support ring of the stator and rotor may be formed from a silicon electrical steel to minimize remanent flux.

Figure 4A:
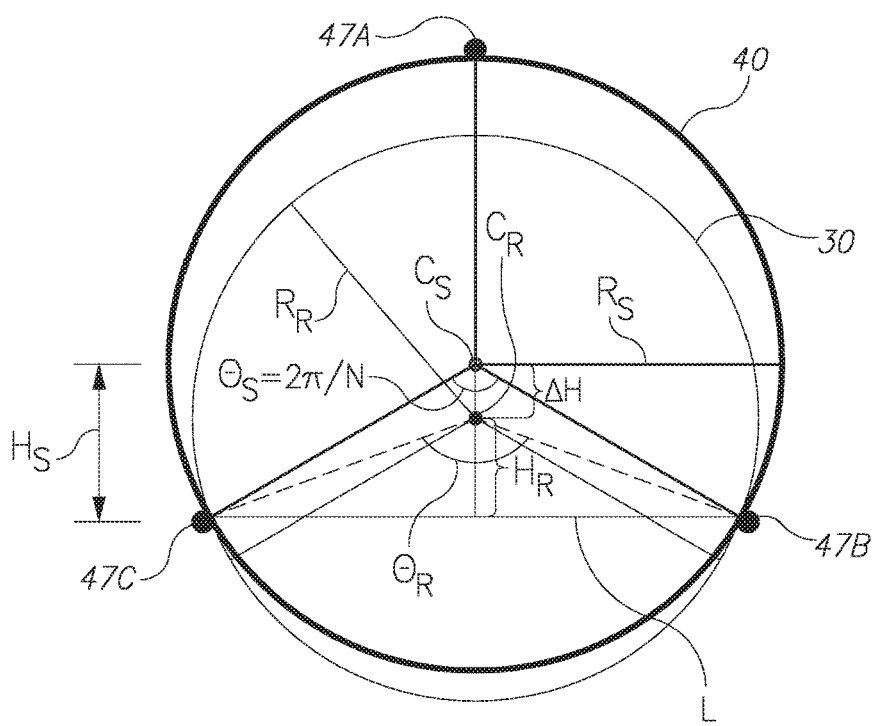
FIGS. 4A and 4B schematically illustrate parameters of the skipping motor shown in FIGS. 1-2F that determine a skip angle of the motor in accordance with an embodiment of the disclosure.
Figure 4B:
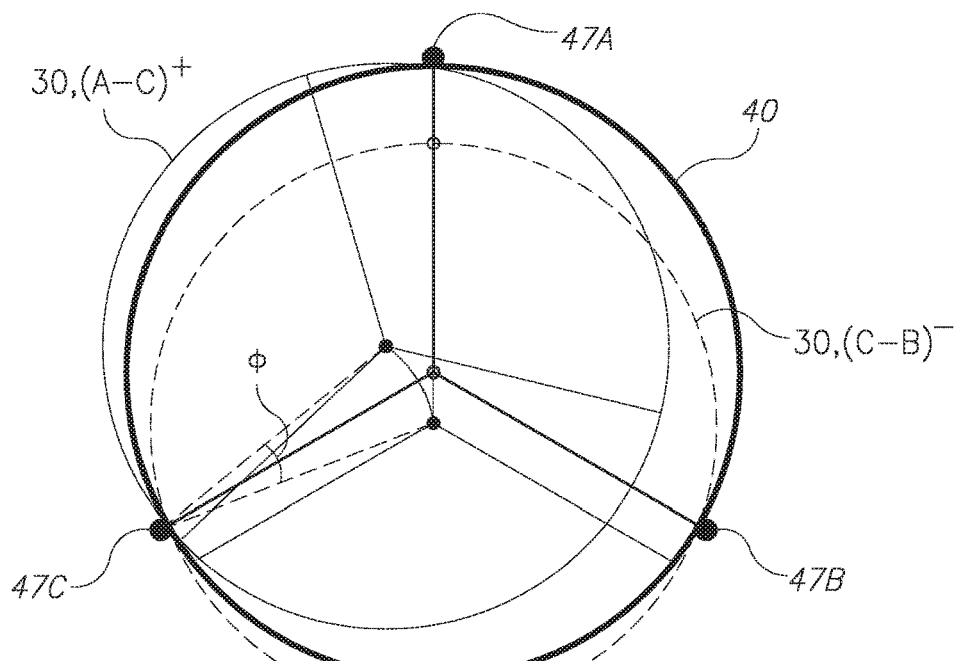

FIGS. 4A and 4B schematically illustrate parameters of skipping motor 20 shown in FIGS. 1-2F that may be used to determine a magnitude of an angle, a skip angle by which the motor rotates in skipping from a first motor state to a next, second motor state of the motor in accordance with an embodiment of the disclosure. FIGS. 4A and 4B show highly schematic drawings of skipping motor 20 in which features of skipping motor 20 shown in FIGS. 1-2F are represented by idealized geometric entities labeled by the labels that respectively label the features in FIGS. 1-2F. Stator 40 is represented by a bold line circle labeled 40 and stator contact surfaces 47A, 47B 47C, are represented by solid circles labeled 47A, 47B 47C. Stator 40 has a center $C_S$ and radius $R_S$. Rotor 30 is represented by a thin line circle 30, having a center $C_R$ and radius $R_R$. FIG. 4A schematically shows skipping motor 20 in motor state (C-B)⁻ shown in FIG. 2C. FIG. 4B shows skipping motor 20 in motor state (A-C)⁺ shown in FIG. 2B that preceded motor state (C-B)⁻ as rotor 30 rotated clockwise. FIG. 4B also shows skipping motor 30 in motor state (C-B)⁻. In FIG. 4B for motor state (A-C)⁺ rotor 30 is represented by a solid line circle. For motor state (C-B)⁻ in FIG. 4B rotor 30 is shown as a dashed line circle. The skip angle between motor state (A-C)⁺ and motor state (C-B)⁻ is shown in FIG. 4B as an angle Φ.

In motor state (C-B)⁻ shown in FIG. 4A stator 40 and rotor 30 share a same chord labeled for convenience by its length "L". Chord L subtends an angle $\Theta_S$ at center $C_S$ of stator 40. In general, $\Theta_S$ is equal to $2\pi/N$ where N is a number of stator contact surfaces that the stator comprises. For skipping motor 20, N=3 and $\Theta_S=2\pi/3=120°$. Chord L subtends an angle $\Theta_R$ at center $C_R$ of rotor 30. Distance of center $C_S$ from chord L is represented by a height $H_S$ and distance of center $C_R$ from chord L is represented by a height HR. Let $\Delta H=(H_S-H_R)$. Then $$\Delta H=(H_S-H_R)=[R_S \cos(\Theta_S/2)-R_R \cos(\Theta_R/2)]. \quad (1)$$

Skipping angle Φ between motor state (A-C)⁺ and motor state (C-B)⁻ shown in FIG. 4B may be written, $$\Phi=2 \arctan[(\Delta H/R_R)\sin(\pi/3)]. \quad (2)$$

For $(R_S-R_R)<<R_R$ and as a result $\Delta H<<R_R$ expression 2) becomes, $$\Phi \approx 2(\Delta H/R_R)\sin(\pi/3)=2[((R_S/R_R)\cos(\Theta_S/2)\cdot\cos(\Theta_R/2)) \sin(\pi/3)]. \quad (3)$$

FIGS. 5A-5C schematically show configuration of skipping motors in accordance with embodiments of the disclosure that are variations of skipping motor 20.

FIG. 5A schematically shows a skipping motor 200 comprising a rotor 230 having a center $C_R$ and radius $R_R$ seated inside a stator 240 in accordance with an embodiment of the disclosure. Stator 240 comprises, optionally three, electromagnets 241A, 241B, and 241C, having cores 243A, 243B, 243C that are supported on a base plate 244 and are surrounded respectively by conductive coils 245A, 245B, and 245C. Cores 243A, 243B, and 243C have respective extensions 248A, 248B, and 248C, and each core has a shelf 246 and a spacer 249 seated on the shelf on which rotor 240 rests. In the perspective of FIG. 5A only shelf 246 and spacer 249 of electromagnet 241C are shown. Extensions 248A, 248B, and 248C of electromagnets 241A, 241B, and 241C may have concave, crescent contact surfaces 247A, 247B, and 247C, optionally having a radius of curvature $R_S$ greater than radius $R_R$ of rotor 230. Crescent contact surfaces 247A, 247B, and 247C optionally exhibit threefold rotational symmetry and lie on a same circular cylindrical surface (not shown) having radius $R_S$. Spacers 249 are advantageously made from non-ferromagnetic material, and operate to distance rotor 230 from shelves 246, in order to reduce the magnetic force between rotor 230 and shelves 246. In an embodiment, spacers 249 are made of low friction material, such as teflon, to lower friction forces between rotor 230 and shelves 246.

FIG. 5B schematically shows a skipping motor 300 optionally comprising an annular rotor 330 and a stator 340 having, optionally three, electromagnets 341A, 341B, and 341C each having a core 343 supported on a base plate 344. Cores 343 of electromagnets 341A, 341B, and 341C are surrounded respectively by conductive coils 345A, 345B and 345C, and each core is formed having a shelf 346 and a spacer 349 seated on the shelf on which annular rotor 330 rests. In the perspective of FIG. 5A only shelf 346 and spacer 349 of electromagnet 341B are shown. In an embodiment cores 343 of electromagnets 341A, 341B, are formed having convex contact surfaces 347A, 347B, and 347C respectively that are surrounded by rotor 330. Rotor 330 has an internal radius $R_R$ and convex contact surfaces 347A, 347B, and 347C optionally have a radius of curvature $R_S$ and are tangent to a circular cylindrical surface having radius $R_S$ smaller than $R_R$. Shelves 346 are covered by spacers 349 that reduce friction between shelves 346 and rotor 330. Spacers 349 are advantageously made from non-ferromagnetic material, and operate to distance rotor 330 from shelves 346, in order to reduce the magnetic force between rotor 330 and shelves 346. In an embodiment, spacers 349 are made of low friction material, such as teflon, to lower friction forces between rotor 330 and shelves 346.

FIG. 5C schematically shows a skipping motor 400 comprising a stator 440 having a hub 442 from which electromagnets 441A, 441B, and 441C extend and an annular rotor 430 surrounding the stator in accordance with an embodiment of the disclosure. Electromagnets 441A, 441B, and 441C have cores 443 that are surrounded respectively by conductive coils 445A, 445B, and 445C and have contact surfaces 447A, 447B, and 447C respectively. Skipping motor 400 is substantially an inversion of skipping motor 20 shown in FIGS. 1-2F, and has electromagnets formed on an internal stator surrounded by an annular rotor rather than having electromagnets formed on an external stator surrounding an internal rotor.

By way of a numerical example, a skipping motor constructed in accordance with an embodiment similar to that shown in FIG. 5B, comprised a rotor 330 having inner radius $R_R$ equal to about 36 mm (millimeters), and a stator 340 having electromagnets 341A, 341B, and 341C and radius $R_S$ equal to about 35.65 mm. The skipping motor exhibited a skip angle equal to about $2\pi/400=0.016$ radians or about 1 degree. Another skipping motor having $R_R$ equal to about 36 mm and $R_S$ equal to about 35.89 mm exhibited a skip angle equal to about $2\pi/800=0.008$ radians or about ½ degree.

Cores 343 of electromagnets 341A, 341B, and 341C of the skipping motors in the example were formed from a relatively soft magnetic AISI (American Iron and Steel Institute) 1020 carbon steel with 0.2% carbon. The steel surfaces were blackened with gun blue (selenious acid) and very slightly oiled. Coils 345A, 345B, and 345C, of the electromagnets were APW model FC-4776 electromagnet stock coils, having bobbin length of 16.6 mm, inner diameter of 12.7 mm and outer diameter of 22 mm. The coils had 1990 turns and were designed for 24 V operation. The motors were controlled by an Ace controller made by Velocio.net and three driver chips TIL293 made by Texas Instruments, with each chip controlling a different coil. A PC based program was used to create run programs for the controller, which allowed to select the skip timing and the number of skips. Due to the controller limitation, the fastest skip time was 10 ms.

A force between a core 343 of an electromagnet 341A, 341B, or 341C and rotor 430 due to driving the electromagnet's coil with 24 volts DC was calculated to be 30 N (Newtons). Assuming a friction coefficient of 0.25 between slightly oiled steel surfaces, a resultant holding torque of rotor 330 provided by contact of the rotor with contact surfaces of cores 343 of two of the electromagnets, was calculated to be 0.27 Nm (Newton-meter). A holding torque of 0.35 Nm was actually measured.

Figure 6A:
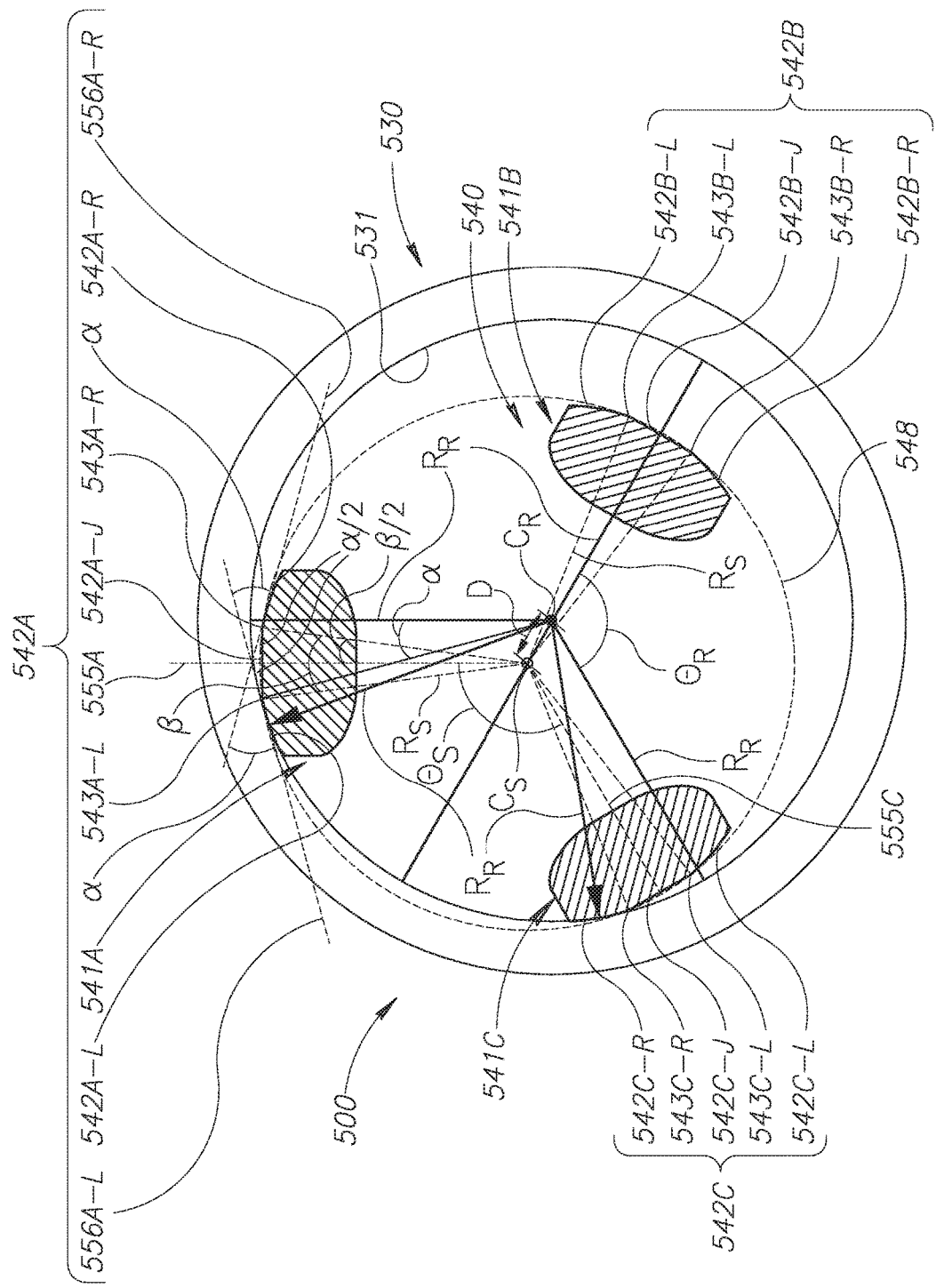
FIGS. 6A and 6B schematically show a skipping motor having two contact surfaces for each electromagnet comprised in the motor, in accordance with an embodiment of the disclosure.
Figure 6B:
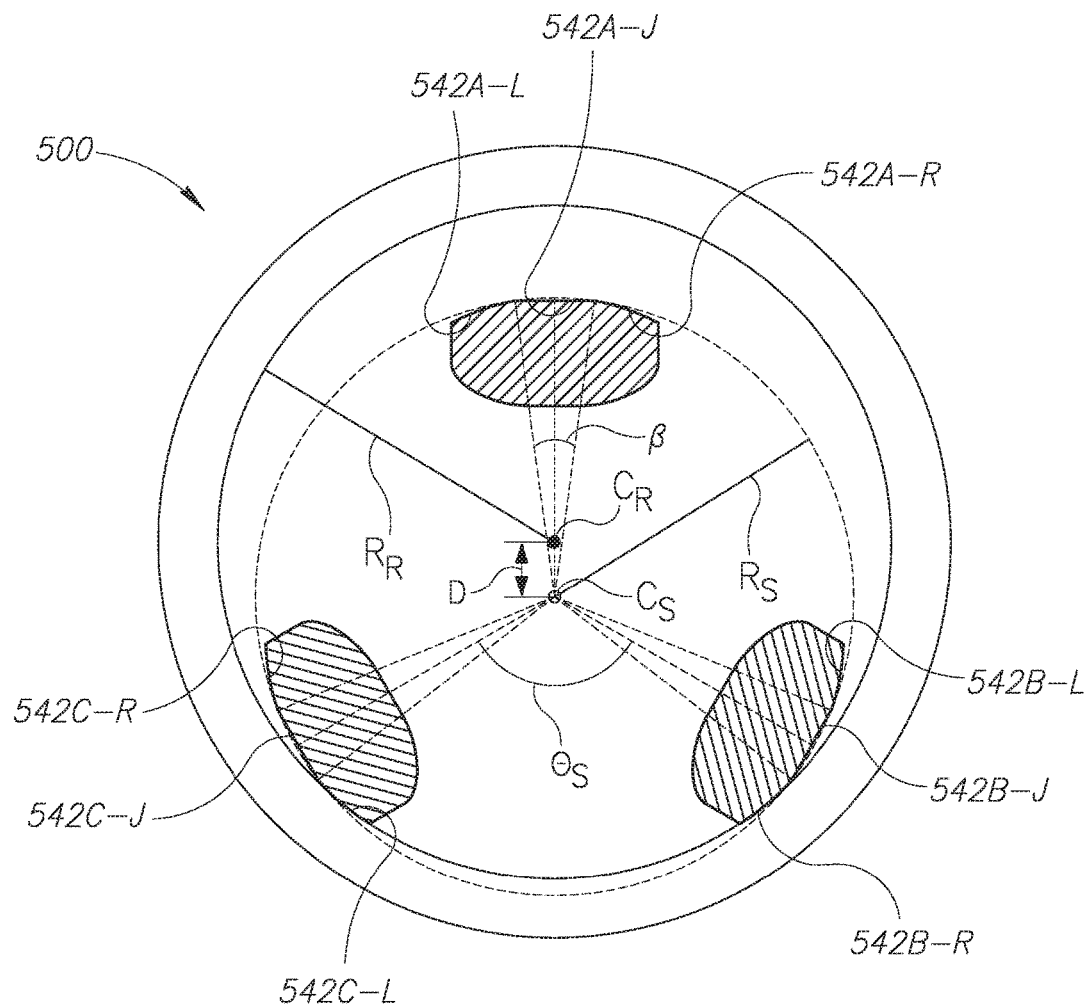

FIGS. 6A and 6B schematically show a cross-section plan view of a skipping motor 500, hereinafter also referred to as a "roloskip" motor, in accordance with an embodiment of the disclosure that exhibits an advantageously smooth, rolling motion in skipping from a first motor state to a second motor state.

Roloskip motor 500 optionally comprises an annular rotor 530 having an inner surface 531 of radius $R_R$ and center $C_R$ surrounding a stator 540, optionally similar to stator 240 shown in FIG. 5B, but having a plurality of N, optionally equal to three, substantially identical, electromagnets 541A, 541B, and 541C. The electromagnets may be configured in a threefold rotationally symmetric geometry about an axis of the stator that intersects and is perpendicular to the cross-section view in FIGS. 6A and 6B at a center $C_S$ of a virtual surface of rotation indicated by a dashed circle 548 having a radius $R_S$. As described in the discussion below each electromagnet may comprise two contact surfaces and when skipping between a first and a second motor state, rotor 530 "skip-rolls" from one to another of the contact surfaces of a same electromagnet. FIG. 6A shows roloskip motor 500 in a motor state (A-C) in which rotor 530 contacts stator contact surfaces of electromagnets 541A and 541C. FIG. 6B shows roloskip motor 500 after a counterclockwise rotation of rotor 530 to a motor state (C-A), in which rotor 530 contacts stator contact surfaces of electromagnets 541C and 541A.

Electromagnet 541A is formed having a compound surface 542A facing rotor 530 that comprises left and right stator contact surfaces 542A-L, and 542A-R respectively. The left and right contact surfaces are optionally spliced to a same, optionally planar, join surface 542A-J at respective left and right seams. The seams are indicated and referenced by left and right seam points 543A-L and 543A-R respectively at which the seams intersect the plane of FIG. 6A. In an embodiment, left and right contact surfaces 542A-L and 542A-R of electromagnet 541A are mirror image surfaces in a plane indicated by a line labeled 555A that passes through center $C_S$. Left and right seam points 543A-L and 543A-R lie on circle 548. Join surface 542A-J between seam points 543A-L and 543A-R subtends an angle β at center $C_S$. Reference to left and right with respect to electromagnet 451A refers respectively to left and right sides of plane 555A when looking outward from center $C_S$ toward the electromagnet. Each left and right contact surface 542A-L and 542A-R of electromagnet 541A has a radius of curvature substantially equal to inner radius $R_R$ of annular rotor 530. Tangents 556A-L and 556A-R to right and left contact surfaces 542A-L and 542A-R at seam points 543A-L and 543A-R respectively, enclose an angle α.

Similarly, electromagnet 541B has a compound surface 542B having left and right contact surfaces 542B-L and 542B-R having respective radii of curvature equal to $R_R$. Contact surfaces 542B-L, and 542B-R are mirror images of each other in a plane 555B and are spliced to an optionally planar, join surface 542B-J at respective left and right seam points 543B-L and 543B-R. Tangents (not shown) to left and right contact surfaces 542B-L, and 542B-R at seam points 543B-L and 543B-R enclose an angle α. And electromagnet 541C has a compound surface 542C having left and right contact surfaces 542C-L and 542C-R having respective radii of curvature equal to $R_R$. 542C-L, and 542C-R are mirror images of each other in a plane 555C and are joined at seams 543B-L and 543B-R to an optionally planar surface 542C-J. Tangents (not shown) to left and right contact surfaces 542C-L and 542C-R at seam points 543C-L and 543C-R enclose an angle α. As in the case of electromagnet 541A, left and right seam points of electromagnets 541B, and 541C lie on circle 548.

At any given motor state of roloskip motor, a left or right stator contact surface of one of electromagnets 541A, 541B, or 541C and a right or left stator contact surface respectively of another of electromagnets 541A, 541B, or 541C are substantially coincident with portions of inner surface 531 of rotor 530. For example, as noted above, FIG. 6A shows roloskip motor 500 in a motor state (A-C) in which rotor 530 contacts stator electromagnets 541A and 541C and the figure shows that left and right contact surfaces 542A-L and 542C-R are substantially coincident with portions of inner surface 531 of rotor 530. Similarly, FIG. 6B shows roloskip motor 500 in motor state (C-B) in which rotor 530 contacts stator electromagnets 541C and 541B and the figure shows that left and right contact surfaces 542C-L and 542B-R are substantially coincident with portions of inner surface 531 of rotor 530.

In skipping from a first to a second motor state of roloskip motor 500, as for example skipping between motor state (A-C) shown in FIG. 6A and motor state (C-B) shown in FIG. 6B, rotation of rotor 530 is characterized by an amplitude of nutation D shown in FIG. 6A. Assuming that rotor 530 does not slip on stator contact surfaces of stator 540 when skipping between motor states, a skip angle between the motor states may be estimated to be equal substantially to the angle α discussed above.

For a roloskip motor similar to roloskip motor 500 but having N electromagnets similar to electromagnets comprised in roloskip motor 500 that are configured in an N-fold symmetric geometry, relationships between a desired skip angle α and geometric parameters of the roloskip motor may be provided by the following expressions:

$$\Theta_S = 2\pi/N; \qquad (4)$$

$$D = -(R_S \sin \beta/2)/\cos \Theta_S; \qquad (5)$$

$$\tan \beta = (R_R \sin \alpha - D \sin \Theta_R/2)/(R_R \cos \alpha - D \cos \Theta_R/2); \text{ and} \qquad (6)$$

$$R_S = [(R_R \sin \alpha - D \sin \Theta_R/2)^2 + (R_R \cos \alpha - D \cos \Theta_R/2)^2]^{1/2}. \quad (7)$$

For roloskip motor 500, N=3, and electromagnets 541A, 541B, and 541C, may be pulsed to magnetize and demagnetize the electromagnets to rotate rotor 530 clockwise or counterclockwise similarly to the manner in which electromagnets 41A, 41B, and 41C comprised in skipping motor 20 are pulsed to rotate rotor 30 respectively counterclockwise and clockwise.

Figure 7:
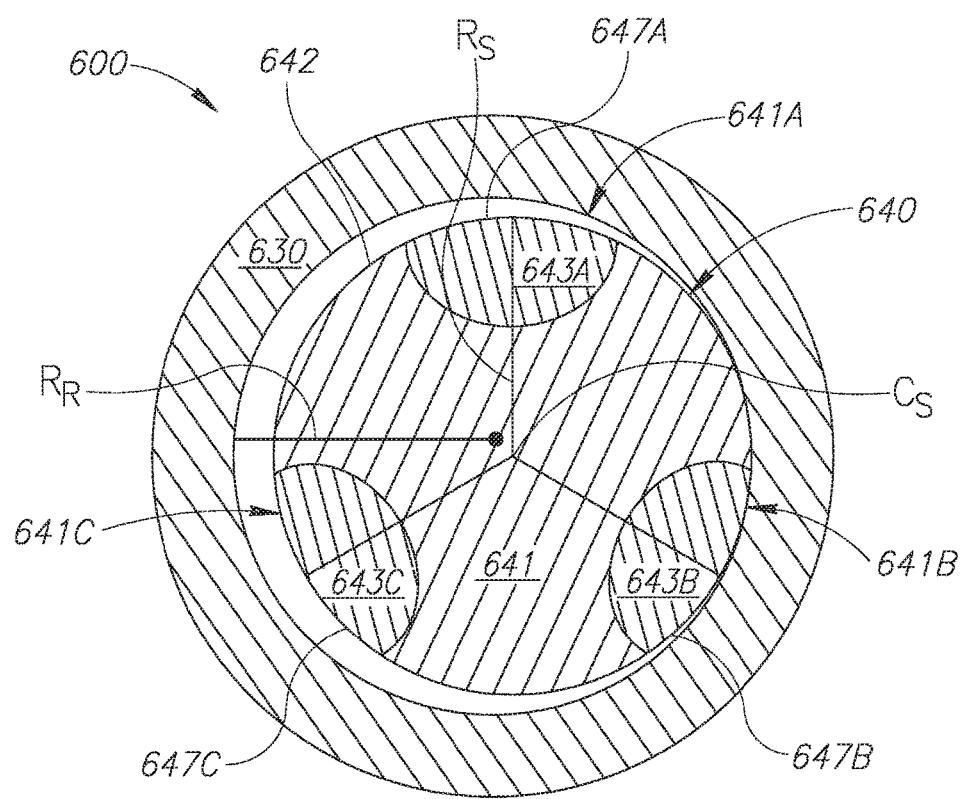
FIG. 7 schematically shows a skipping motor configured to provide a relatively smooth skip between motor states of the motor, in accordance with an embodiment of the disclosure.
Figure 8A:
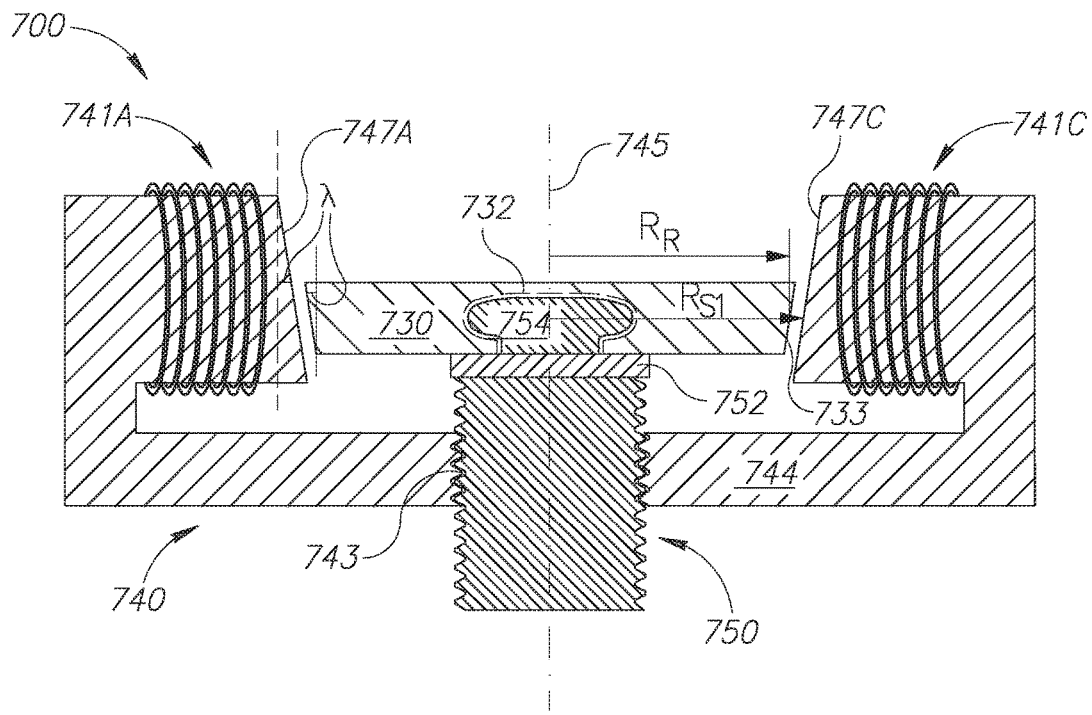
FIGS. 8A and 8B schematically shows a skipping motor for which a skipping ratio is changeable, in accordance with an embodiment of the disclosure.
Figure 8B:
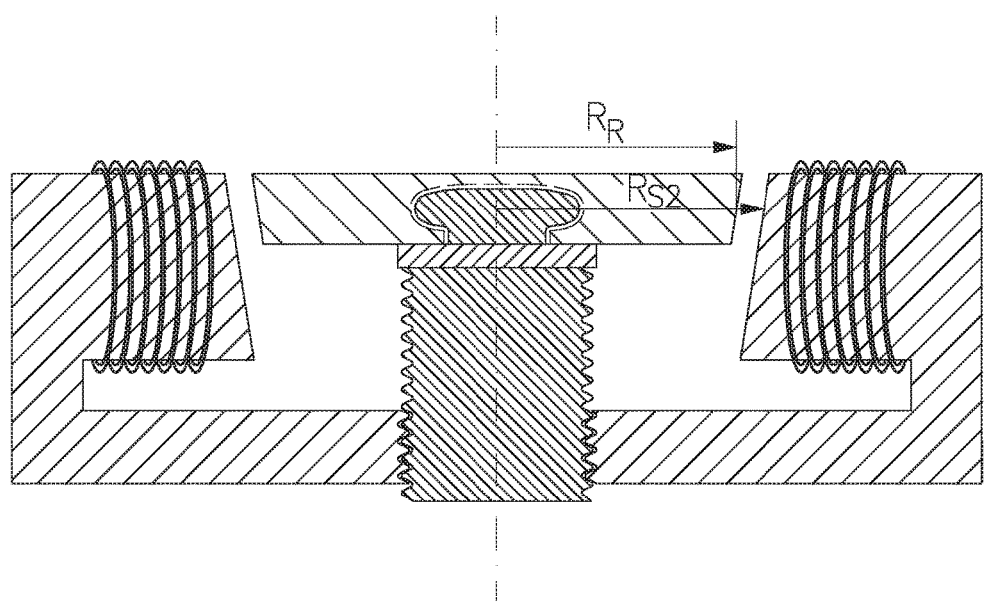

FIG. 7 schematically shows another roloskip motor 600 configured to provide a relatively smooth rolling motion between motor states, in accordance with an embodiment of the disclosure. Roloskip motor 600 comprises a rotor 630 and a stator 640 having electromagnets 641A, 641B and 641C, which have respective cores 643A, 643B and 643C formed having stator contact surfaces 647A, 647B, and 647C respectively. Spaces between cores 643A, 643B and 643C are filled with a filler material 641 advantageously formed from a nonferromagnetic wear resistant filler material, such as by way of example, a glass epoxy, polyimide, brass, or aluminum. Advantageously the filler is formed to exhibit relatively low electrical conductivity to moderate eddy current energy loss. To provide smooth and quite skipping between motor states, stator contact surfaces 647A, 647B, and 647C and a surface 642 of filler 641 lie on a same circular cylindrical surface having a center $C_S$ and radius $R_S$ FIGS. 8A and 8B schematically show cross-sections of a skipping motor 700 in accordance with an embodiment of the disclosure for which a ratio, a skipping ratio, between a radius of a rotor and a stator that the motor comprises, and thereby a skipping angle of the motor are adjustable.

Skipping motor 700 optionally comprises a stator 740 having four electromagnets 741A, 741B, 741C and 741D only two of which, electromagnets 741A and 741C, that are opposite each other are shown in the figure. Electromagnets 741A, 741B, 741C and 741D are optionally arranged in a rotationally symmetric configuration having an angle of rotational symmetry equal to $2\pi/4$. The skipping motor comprises a rotor 730 mounted to a set screw stem 750 having a friction reducing bearing 752 on which the rotor rests in accordance with an embodiment of the disclosure. Set screw stem 750 is secured to rotor 730 by an optionally elliptical head 754 of the set screw stem that is held in a socket 732 of the rotor. Dimensions and tolerances of elliptical head 754 and socket 732 are determined to allow nutating skipping rotation of rotor 730. The set screw stem seats in a threaded hole 743 in a base 744 of stator 740 having threads that match threads of the set screw stem. Electromagnets 741A-741D are formed having stator contact surfaces 747A-747D respectively that are portions of a surface of a right circular cone angled in the cross section shown in FIGS. 8A and 8B by an angle λ with respect to an axis 745 of the stator. In the cross-section view of FIGS. 8A and 8B only stator contact surfaces 747A and 747C are shown. An edge surface 733 of rotor 730 is angled with respect to axis 745 optionally by same angle λ with respect to axis 745 as are stator contact surfaces 747A and 747C. Rotor 730 has an average radius $R_R$.

Position of rotor 730 along axis 745 relative to stator contact surfaces 747A and 747C may be changed by rotation set screw stem 750 to raise or lower rotor 730 relative to base 744 of stator 740. Raising rotor 730 relative to base 744 positions the rotor at locations along axis 745 for which a distance between opposite stator contact surfaces 747A and 747C, is greater and a radius of the stator is greater. Lowering rotor 730 relative to base 744 positions the rotor at locations along axis 745 for which a distance between opposite stator contact surfaces 747A and 747C is smaller and a radius of the stator is smaller. Raising and lowering rotor 730 increases and decreases respectively a radius of stator 740 at the location of the rotor along axis 745 and thereby increases and decreases the skipping ratio, and as indicted by expression (3) respectively increases and decrease the skipping angle of skipping motor 700. FIG. 8A schematically shows skipping motor 700 with rotor 730 located at a first height above base 744 for which stator 740 has an average radius $R_{S1}$. FIG. 8B shows skipping motor 700 having rotor 730 located at a second height above base 744 for which stator 740 has an average radius $R_{S2} > R_{S1}$. A skipping ratio and skipping angle of skipping motor 700 shown in FIG. 8B are respectively greater than a skipping ratio and skipping angle of skipping motor 700 shown in FIG. 8A.

Figure 9A:
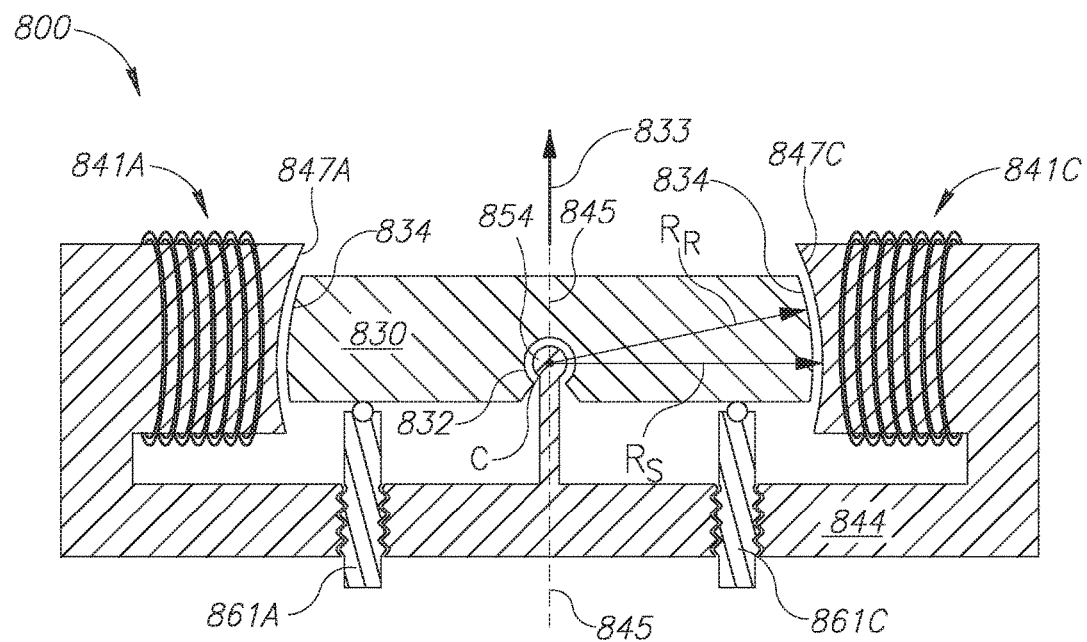
FIGS. 9A and 9B schematically show a skipping motor for which an angle between an axis of rotation of a rotor in the skipping motor may be changed relative to an axis of the stator of the skipping motor, in accordance with an embodiment of the disclosure.
Figure 9B:
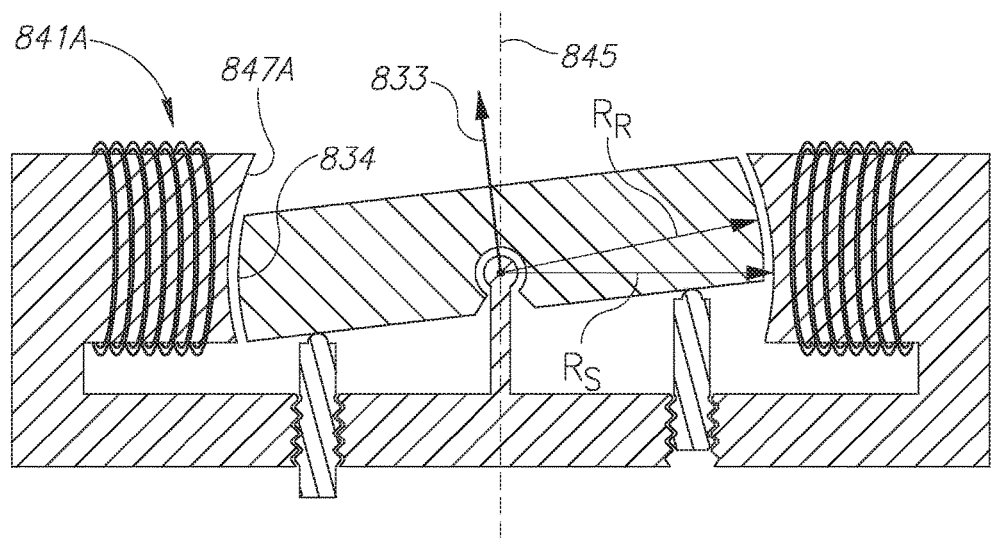

FIGS. 9A and 9B schematically show cross-sections of a skipping motor 800 in accordance with an embodiment of the disclosure for which an angle between an axis of rotation of a rotor in the skipping motor may be changed relative to an axis of the stator of the skipping motor.

Skipping motor 800 optionally comprises a stator 840 having four electromagnets 841A, 841B, 841C and 841D only two of which, electromagnets 841A and 841C, that are opposite each other are shown in the figure. Electromagnets 841A, 841B, 841C and 841D are optionally arranged in a rotationally symmetric configuration having an angle of rotational symmetry equal to $2\pi/4$. The skipping motor comprises a rotor 830 mounted to a stem 850 having a ball 854 that seats in a matching socket 832 formed in the rotor in accordance with an embodiment of the disclosure. Dimensions and tolerances of ball 854 and socket 832 are determined to allow nutating skipping rotation of rotor 830. Optionally, rotor 830 rotatably rests on at least three bearing posts that may be raised and lowered to control attitude of rotor 830 and an angle between an axis 833 of rotation of the rotor and axis 845 of stator 840. Skipping motor 800 is assumed by way of example to comprise four bearing posts 861A, 861B, 861C, and 861D of which in FIGS. 9A and 9B only bearing posts 861A, and 861C are shown. Rotor 830 has an edge surface 834 that is a spherical zone having center C located at a center of ball 854 and a radius $R_R$. Electromagnets 841A, 841B, 841C, and 841D have stator contact surfaces 847A, 847B, 847C, and 847D respectively, each of which is a portion of a surface of sphere having a radius $R_S$ and center C so that the stator contact surfaces are concentric with spherical zone edge surface 834 of rotor 830. In FIGS. 9A and 9B only stator contact surfaces 847A and 847C are shown.

Because edge surface 834 and stator contact surfaces 847A, 847B, 847C, and 847D are concentric, attitude of axis of rotation 833 of rotor 830 relative to axis 845 may be changed without changing the skipping ratio and thereby skip angle of skipping motor 800. FIG. 9A schematically shows skipping motor 800 for which bearing posts support rotor 830 with rotor axis 833 substantially parallel to axis 845 of stator 840. FIG. 9B schematically shows skipping motor 800 for which bearing posts support rotor 830 with rotor axis 833 at an angle θ relative to axis 845.

It is noted that in the above discussion skipping motors are described as having N electromagnets and contact surfaces that are rotationally symmetric and having an angle of rotational symmetry and angle between locations of the electromagnets equal to $2\pi/N$. However, practice of an embodiment of the disclosure is not limited to rotational symmetries for which electromagnets are angularly equally spaced. For example, an angle between a first pair of angularly adjacent electromagnets of a skipping motor in accordance with an embodiment of the disclosure may be different that an angle between a second pair of electromagnets in the skipping motor. As a result of the difference, a skip angle between the first pair will be different from the skip angle between the second pair.

It is further noted that in the above discussion skipping motors are described as having a rotor having cylindrical surface and having N electromagnets with contact surfaces that are cylindrical in shape. In an embodiment, the rotor may have a surface that is shaped as a screw, and the contact surfaces of the electromagnets may have contact areas made in a shape of a part of a nut. Skipping the motor will create axial movement of the rotor as well as rotation.

There is therefore provided in accordance with an embodiment of the disclosure a stepper motor comprising: a stator and a rotor; a plurality of N greater than two electromagnets mounted to the stator or to the rotor, each of the electromagnets comprising a low coercivity ($H_C$) core having at least one contact surface, wherein the at least one contact surface of any of the cores is rotatable about a same first axis of rotation with a same first radius of rotation into substantial congruence with at least a portion of the at least one contact surface of any other of the electromagnet cores; a coupling of the rotor to the stator configured to enable rotation of the rotor and contact of the stator and rotor along at least one contact surface during operation of the motor; wherein energizing two of the electromagnets to magnetize their respective cores and energizing one of the electromagnets to remove a magnetic B-field in its core causes the rotor to rotate.

Optionally, cores have magnetic coercivity less than or equal to about 10 Oersted (Oe). Optionally, the cores have magnetic coercivity less than or equal to about 1 Oe. Optionally, the cores have magnetic coercivity less than or equal to about 0.5 Oe.

In an embodiment the stepper motor comprises a controller operable to energize the electromagnets to cause the rotor to rotate from a first motor state of the stepper motor in which the stator and rotor are in contact along a first pair of contact surfaces comprising a contact surface from each core of a first pair of rotationally adjacent electromagnets mounted to the stator or rotor and matching surface regions of the rotor or stator respectively, to a second motor state in which the stator and rotor are in contact along a second pair of contact surfaces comprising a contact surface from each core of a second pair of rotationally adjacent electromagnets and matching surface regions of the rotor or stator respectively, which second pair of contact surfaces shares a contact surface with the first pair of contact surfaces. Optionally, energizing the electromagnets comprises energizing the electromagnets so that a magnetic B-field generated in the stepper motor by energizing the electromagnets is directed toward the first axis of rotation in the core of one of the second pair of electromagnets and away from the first axis of rotation in the core of the other electromagnet of the second pair of electromagnets. Additionally or alternatively, energizing the electromagnets comprises energizing an electromagnet of the first pair of electromagnets to remove a magnetic B-field in the electromagnet.

In an embodiment the first axis of rotation and first radius of rotation is an axis of rotation and a radius of rotation of the rotor or the stator, and the stator or rotor respectively has a second axis of rotation and a second radius of rotation and wherein an angle by which the rotor rotates in rotating from the first to the second motor state is a function of a difference between the first and second radii.

In an embodiment the core of each electromagnet is formed having one contact surface. In an embodiment the core of each electromagnet is formed having two contact surfaces. Optionally, each of the two contact surfaces has a same radius of curvature. Optionally, each of the two contact surfaces has a different axis of rotation.

In an embodiment the contact surfaces are configured in an array that exhibits an N-fold symmetry of rotation and a symmetry angle of rotation equal to $2\pi/N$.

In an embodiment the electromagnets are mounted to the stator or rotor and the cores are formed having shelves that support the rotor or stator respectively. Optionally the stepper motor comprises a spacer between the rotor or stator and each shelf that supports the stator or rotor respectively. The spacers may be made from a non-ferromagnetic and relatively low friction material.

In an embodiment the rotor has a form of an annulus having an inner radius and the contact surfaces are located inside the annulus. Optionally, the contact surfaces are convex.

In an embodiment the rotor has a form of a circular disc or annulus having an outside radius and the contact surfaces are located outside of the rotor. Optionally, the contact surfaces are concave.

In an embodiment, perpendicular to the first axis of rotation the radius of rotation of the contact surfaces about the first axis of rotation is a function of location along the first axis of rotation. Optionally the function is a linear function. Additionally or alternatively, the rotor or stator may be moveable to position the rotor at different locations along the first axis of rotation.

In an embodiment the contact surfaces of the cores of the electromagnets mounted to the stator or rotor are surface portions of a same first spherical surface. Optionally, the matching surfaces of the rotor or stator are surface portions of a same second spherical surface. Optionally, the first and second spherical surfaces have substantially a same center. In an embodiment the stator and rotor are rotatable relative to each other about the center of the sphere.

In an embodiment the contact surfaces lie along a first protruding or recessed helix having a pitch and the matching surfaces lie along a second recessed or protruding helix respectively having the same pitch and meshed with the first helix.

In an embodiment all the contact surfaces lie on a same surface. In an embodiment the stepper motor comprises a controller operable to energize the electromagnets to cause the rotor to rotate from a first motor state of the stepper motor in which the stator and rotor are in contact along a contact surface of a core of a single first electromagnet mounted to the stator or rotor and a matching surface region of the rotor or stator respectively to a second motor state in which the stator and rotor are in contact along single contact surface of a core of a single second rotationally adjacent electromagnet and a matching surface region of the rotor or stator respectively. Additionally or alternatively, spaces between the cores may be filled with a filler material. Optionally, the filler material has surface regions that span distances between the contact surfaces and lie on the same surface on which all the contact surfaces lie.

In an embodiment the surface on which all the contact surfaces lie is a circularly cylindrical surface. In an embodiment the surface on which all the contact surfaces lie is a spherical surface. In an embodiment the stator and rotor are formed from a ferromagnetic material.

In the description and claims of the present application, each of the verbs, "comprise" "include" and "have", and conjugates thereof, are used to indicate that the object or objects of the verb are not necessarily a complete listing of components, elements or parts of the subject or subjects of the verb.

Descriptions of embodiments of the invention in the present application are provided by way of example and are not intended to limit the scope of the invention. The described embodiments comprise different features, not all of which are required in all embodiments of the invention. Some embodiments utilize only some of the features or possible combinations of the features. Variations of embodiments of the invention that are described, and embodiments of the invention comprising different combinations of features noted in the described embodiments, will occur to persons of the art. The scope of the invention is limited only by the claims.

The invention claimed is:

1. A stepper motor comprising:
a stator and a rotor;
a plurality of N greater than two electromagnets mounted to the stator or to the rotor, each of the electromagnets comprising a low coercivity ($H_C$) core having at least one contact surface, wherein the at least one contact surface of any of the cores is rotatable about a same first axis of rotation with a same first radius of rotation into substantial congruence with at least a portion of the at least one contact surface of any other of the electromagnet cores;
a coupling of the rotor to the stator configured to enable rotation of the rotor and contact of the stator and rotor along at least one contact surface during operation of the motor; and
a controller;
wherein energizing two of the electromagnets to magnetize their respective cores and energizing one of the electromagnets to remove a magnetic B-field in its core causes the rotor to rotate and the controller is operable to energize the electromagnets to cause the rotor to rotate from a first motor state of the stepper motor in which the stator and rotor are in contact along a first pair of contact surfaces comprising a contact surface from each core of a first pair of rotationally adjacent electromagnets mounted to the stator or rotor and matching surface regions of the rotor or stator respectively, to a second motor state in which the stator and rotor are in contact along a second pair of contact surfaces comprising a contact surface from each core of a second pair of rotationally adjacent electromagnets and matching surface regions of the rotor or stator respectively, which second pair of contact surfaces shares a contact surface with the first pair of contact surfaces.

2. The stepper motor according to claim 1 wherein the cores have magnetic coercivity less than or equal to about 10 Oersted (Oe), about 1 Oe, or about 0.5 Oe.

3. The stepper motor according to claim 1 wherein energizing the electromagnets comprises energizing the electromagnets so that a magnetic B-field generated in the stepper motor by energizing the electromagnets is directed toward the first axis of rotation in the core of one of the second pair of electromagnets and away from the first axis of rotation in the core of the other electromagnet of the second pair of electromagnets.

4. The stepper motor according to claim 1 wherein energizing the electromagnets comprises energizing an electromagnet of the first pair of electromagnets to remove a remanent magnetic B-field in the electromagnet.

5. The stepper motor according to claim 1 the core of each electromagnet is formed having two contact surfaces.

6. The stepper motor according to claim 5 wherein each of the two contact surfaces has a same radius of curvature.

7. The stepper motor according to claim 6 wherein each of the two contact surfaces has a different axis of rotation.

8. The stepper motor according to claim 1 wherein the contact surfaces are configured in an array that exhibits an N-fold symmetry of rotation and a symmetry angle of rotation equal to $2\pi/N$.

9. The stepper motor according to claim 1 wherein the electromagnets are mounted to the stator or rotor and the cores are formed having shelves that support the rotor or stator respectively and comprising a spacer made from a non-ferromagnetic and relatively low friction material between the rotor or stator and each shelf that supports the stator or rotor respectively.

10. The stepper motor according to claim 1 wherein perpendicular to the first axis of rotation the radius of rotation of the contact surfaces about the first axis of rotation is a function of location along the first axis of rotation.

11. The stepper motor according to claim 10 wherein the rotor or stator is moveable to position the rotor at different locations along the first axis of rotation.

12. The stepper motor according to claim 1 wherein the contact surfaces of the cores of the electromagnets mounted to the stator or rotor are surface portions of a same first spherical surface, the matching surfaces of the rotor or stator are surface portions of a same second spherical surface and the first and second spherical surfaces have substantially a same center.

13. The stepper motor according to claim 12 wherein the stator and rotor are rotatable relative to each other about the center of the sphere.

14. The stepper motor according to claim 1 wherein the contact surfaces lie along a first protruding or recessed helix having a pitch and the matching surfaces lie along a second recessed or protruding helix respectively having the same pitch and meshed with the first helix.

15. A stepper motor according to claim 1 wherein all the contact surfaces lie on a same surface.

16. The stepper motor according to claim 15 and comprising a controller operable to energize the electromagnets to cause the rotor to rotate from a first motor state of the stepper motor in which the stator and rotor are in contact along a contact surface of a core of a single first electromagnet mounted to the stator or rotor and a matching surface region of the rotor or stator respectively to a second motor state in which the stator and rotor are in contact along single contact surface of a core of a single second rotationally adjacent electromagnet and a matching surface region of the rotor or stator respectively.

17. The stepper motor according to claim 15 wherein spaces between the cores are filled with a filler material.

18. The stepper motor according to claim 17 wherein the filler material has surface regions that span distances between the contact surfaces and lie on same surface on which all the contact surfaces lie.

19. The stepper motor according to claim 15 wherein the surface on which all the contact surfaces lie is a circularly cylindrical surface or a spherical surface.

20. The stepper motor according to claim 1 wherein the stepper and rotor are formed from a ferromagnetic material.

* * * * *